(12) United States Patent
Fang et al.

(10) Patent No.: US 8,308,207 B2
(45) Date of Patent: Nov. 13, 2012

(54) ENERGY ABSORPTION DEVICE, ESPECIALLY FOR NON-AXIAL LOADS

(75) Inventors: Xiangfan Fang, Köln (DE); Christoph Seper, Osterreich (AT)

(73) Assignee: Magna Automotive Services GmbH, Sailauf (DE)

( * ) Notice: Subject to any disclaimer, the term of this patent is extended or adjusted under 35 U.S.C. 154(b) by 0 days.

(21) Appl. No.: 13/274,898

(22) Filed: Oct. 17, 2011

(65) Prior Publication Data
US 2012/0032459 A1 Feb. 9, 2012

Related U.S. Application Data

(63) Continuation of application No. 12/445,392, filed as application No. PCT/EP2007/008625 on Oct. 4, 2007, now Pat. No. 8,047,588.

(51) Int. Cl.
*B60R 19/26* (2006.01)
(52) U.S. Cl. ...................................... 293/132
(58) Field of Classification Search .................. 293/132, 293/133, 102, 120, 155; 296/187.09, 187.03, 296/203.02
See application file for complete search history.

(56) References Cited

U.S. PATENT DOCUMENTS

| | | | | |
|---|---|---|---|---|
| 3,857,595 A * | 12/1974 | Plegat | | 293/137 |
| 4,221,413 A * | 9/1980 | Bonnetain | | 293/122 |
| 4,465,312 A * | 8/1984 | Werner | | 293/132 |
| 4,466,646 A * | 8/1984 | Delmastro et al. | | 293/117 |
| 5,056,840 A * | 10/1991 | Eipper et al. | | 293/120 |
| 5,150,935 A * | 9/1992 | Glance et al. | | 293/136 |
| 5,201,912 A * | 4/1993 | Terada et al. | | 293/120 |
| 5,314,229 A * | 5/1994 | Matuzawa et al. | | 296/187.09 |
| 5,560,672 A * | 10/1996 | Lim et al. | | 296/187.05 |
| 5,727,827 A * | 3/1998 | Shibuya et al. | | 293/155 |
| 5,746,419 A * | 5/1998 | McFadden et al. | | 267/140 |
| 5,803,514 A * | 9/1998 | Shibuya et al. | | 293/133 |
| 5,876,077 A * | 3/1999 | Miskech et al. | | 293/132 |
| 6,412,836 B1* | 7/2002 | Mansoor et al. | | 293/132 |
| 6,481,690 B2* | 11/2002 | Kariatsumari et al. | | 293/155 |
| 6,485,072 B1* | 11/2002 | Werner et al. | | 293/132 |
| 6,547,295 B2* | 4/2003 | Vismara | | 293/133 |
| 6,702,345 B1* | 3/2004 | Yoshida | | 293/133 |
| 6,863,321 B2* | 3/2005 | Jonsson et al. | | 293/102 |
| 6,871,890 B2* | 3/2005 | Sato et al. | | 293/155 |
| 6,929,297 B2* | 8/2005 | Muller et al. | | 293/133 |
| 6,938,936 B2* | 9/2005 | Mooijman et al. | | 293/120 |
| 7,077,442 B2* | 7/2006 | Arns | | 293/155 |
| 7,093,866 B2* | 8/2006 | Toneatti et al. | | 293/133 |
| 7,303,219 B2* | 12/2007 | Trabant et al. | | 293/155 |
| 7,399,015 B2* | 7/2008 | Patel et al. | | 293/133 |

(Continued)

FOREIGN PATENT DOCUMENTS

DE 4312507 A1 10/1994

(Continued)

*Primary Examiner* — Kiran B. Patel
(74) *Attorney, Agent, or Firm* — Dickinson Wright PLLC

(57) ABSTRACT

The invention relates to an energy absorption device which can be arranged to absorb energy by deformation between a support structure of a vehicle and a damper, the energy absorption device carrying a deformable main profile which has a hollow body-type cross-section. The aim of the invention is to improve an energy absorption device of the aforementioned type in such a manner that the energy can be well carried off even if the forces produced by an accident impact the energy absorption device at an angle. For this purpose, a deformable supplementary profile is provided on the cross-section of the main profile.

36 Claims, 18 Drawing Sheets

U.S. PATENT DOCUMENTS

RE40,736 E * 6/2009 Heatherington et al. ..... 293/102

FOREIGN PATENT DOCUMENTS

| | | | |
|---|---|---|---|
| DE | 10157013 | A1 | 9/2002 |
| DE | 10297242 | T5 | 10/2004 |
| DE | 10359483 | A1 | 7/2005 |
| EP | 1533192 | A1 | 5/2005 |
| FR | 2867731 | A1 | 9/2005 |
| GB | 2341149 | A | 3/2000 |
| WO | 2006036065 | A1 | 4/2006 |

* cited by examiner

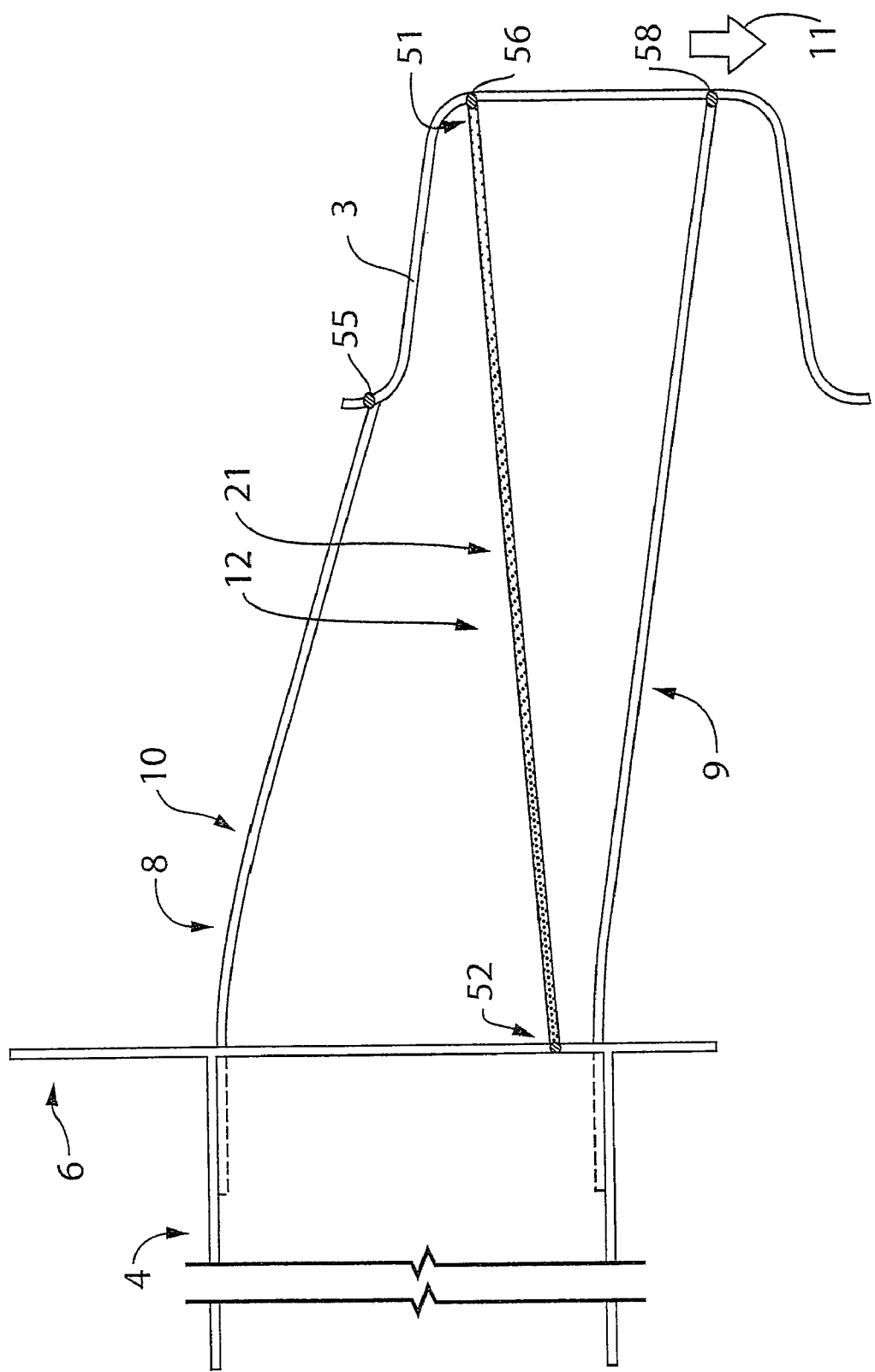

ENERGY ABSORPTION DEVICE, ESPECIALLY FOR NON-AXIAL LOADS

CROSS-REFERENCE TO RELATED APPLICATIONS

This is a Continuation Patent Application which claims the benefit of U.S. patent application Ser. No. 12/445,392 filed Apr. 13, 2009 entitled "Energy Absorption Device, Especially For Non-Axial Loads" which claims the benefit as a 371 U.S. National Stage Application from International Application No. PCT/EP2007/008625 filed Oct. 4, 2007 which claims the benefit of DE 10 2006 048 429.0 filed Oct. 12, 2006, the entire disclosures of the applications being considered part of the disclosure of this application, and hereby incorporated by reference.

FIELD OF THE INVENTION

The present invention relates to an energy absorption device, and more particularly to an energy absorption device which may be situated between a support structure of a vehicle and a bumper to absorb energy by deformation.

BACKGROUND OF THE INVENTION

Energy absorption devices are used for the purpose of absorbing as much energy as possible in the event of an accident, before the vehicle body of the vehicle plastically deforms. In less severe accidents, the energy absorption capability of an energy absorption device may be sufficient to entirely avoid plastic deformation of the vehicle body. The repair costs remain low in this way, because only the bumper and the energy absorption device have to be replaced.

For good energy absorption, it is optimal if the energy absorption devices are implemented as an extension of longitudinal girders of an underbody of the vehicle and the bumper, in particular its crossbeam, is located horizontally at the height of the energy absorption devices. The forces are thus introduced linearly into the energy absorption device, by which its entire length may be used well for the deformation, i.e., absorbing energy.

The vehicle manufacturers have made efforts to bring as many vehicle variants as possible onto the market. To keep the costs as low as possible, the various vehicle variants are constructed on one underbody. If sports utility vehicles or SUVs are constructed on a passenger automobile underbody, the underbody is higher than in the passenger automobile. According to the legal requirements, however, the bumper, in particular its crossbeam, must be located at the height which normally corresponds to a passenger automobile bumper. This means that a Vertical offset between the bumper, in particular its crossbeam, and longitudinal girders of the underbody is to be bridged.

One possibility is to implement the energy absorption device, as up to this point, as a longitudinal extension of the longitudinal girder of the underbody, but provide a bumper with a cross member which extends over the entire vertical area and is implemented as solid. In this way, the forces may be introduced into the energy absorption device well and absorbed thereby.

Generic, or type-specific energy absorption devices are also known and used to bridge the offset between the bumper, or a cross-member of the bumper, and the longitudinal beam of the chassis. More compact and lighter bumpers, in particular their cross-members, may thus be used for a weight reduction. However, tests have shown that accident forces are not conducted straight enough through such energy absorption devices, which amounts to poor energy absorption.

SUMMARY OF THE INVENTION

The present invention is based on the object of improving an energy absorption device according to the species in the simplest possible way so that energy may be dissipated well, but nonetheless forces are introduced diagonally into the energy absorption device.

The auxiliary profile stabilizes the main profile of the energy absorption device and particularly counteracts an undesired buckling of the energy absorption device. In this way, the energy absorption device remains stable for the absorption and transmission of forces in spite of forces being introduced diagonally or even transversely. This means that in spite of the diagonally introduced forces, good efficiency of the energy absorption is achieved. In particular, in the event of an offset between support structure and bumper, compact and light bumpers are usable. If bumpers are implemented having crossbeams, the crossbeam may be implemented as light and compact.

If the bumper is situated offset to the support structure and the energy absorption device bridges the offset, the auxiliary profile may advantageously stabilize a cross-sectional section of the main profile, which is situated in front in the offset direction. A cross-sectional section of the main profile, which is especially endangered by buckling, is stabilized in this way.

The cross-sectional section may preferably be a lower cross-sectional section of the main profile in relation to the vehicle. Pivoting of the bumper downward in the event of an accident is thus counteracted and the forces are absorbed well.

The auxiliary profile may preferably stabilize an approximately horizontal lateral cross-sectional section of the main profile in relation to the vehicle. A cross-sectional section of the main profile is thus stabilized, which is situated in front in the direction of a transverse component of an accident force, i.e., a cross-sectional section of the main profile which is endangered by buckling by the transverse component of the accident force is stabilized. Energy may thus be absorbed efficiently even in the event of a diagonal frontal impact using the energy absorption device.

The lateral cross-sectional section may especially favorably be an outer cross-sectional section in relation to a longitudinal central direction of the vehicle. This has an especially good stabilizing effect in the event of accident forces which displace the bumper in the cited outward direction.

The auxiliary profile may especially advantageously have an essentially arched cross-section. This provides it with good rigidity against undesired buckling.

The cross-section of the auxiliary profile may especially favorably implement an essentially convex contour with an area of the cross-section of the main profile. The auxiliary profile and the area of the cross-section of the main profile thus have good rigidity against buckling and supplement one another mutually.

The cross-section of the auxiliary profile may advantageously have chamfers. The chamfers have a stabilizing effect against undesired buckling.

The auxiliary profile may preferably be situated in the interior of the main profile. The energy absorption device may thus be implemented in a space-saving way and nonetheless has good stability and good energy absorption capability.

The auxiliary profile may preferably taper in the direction toward the support structure of the vehicle. The energy absorption device is thus more strongly stabilized on the side of the bumper against undesired buckling in the offset direction than on the side of the support structure of the vehicle.

The height of the cross-section of the auxiliary profile may especially advantageously decrease in the direction toward the support structure of the vehicle. In this way, the auxiliary profile has a greater stabilizing effect against undesired buckling in the direction of its height on the side of the bumper than on the side of the support structure of the vehicle.

The auxiliary profile may advantageously taper in the direction toward the bumper. In this way, the energy absorption device is more strongly stabilized against undesired buckling in the direction of the transverse component of the accident force on the side of the support structure than on the side of the bumper.

The height of the cross-section of the auxiliary profile may preferably decrease in the direction toward the bumper. The auxiliary profile thus has a greater stabilizing effect against undesired buckling in the direction of its height on the side of the support structure than on the side of the bumper.

If the bumper is situated offset to the support structure and the energy absorption device bridges the offset, the auxiliary profile may especially favorably have an inclination in relation to a longitudinal direction of the support structure, which is opposite to the direction of the offset. The forces introduced from the bumper may thus be conducted through the energy absorption device having a stronger component parallel to the longitudinal direction of the support structure in spite of the offset.

If the bumper is situated offset to the support structure and the energy absorption device bridges the offset, the auxiliary profile may preferably have a profile back which is inclined opposite to the direction of the offset in relation to the longitudinal direction of the support structure. In this way, forces may be conducted at an angle through the profile back and at least partially compensate for the angularity of forces which are conducted through the main profile. The sum of the forces conducted through the energy absorption device thus approaches the longitudinal direction of the support structure better in its direction.

The auxiliary profile may especially advantageously be laterally inclined horizontally in relation to a longitudinal direction of the support structure. The auxiliary profile is thus inclined corresponding to a transverse component of an accident force to be expected and has an especially good stabilizing effect against undesired buckling in relation to the transverse component.

The auxiliary profile may especially favorably have a profile back which is laterally inclined horizontally in relation to a longitudinal direction of the support structure. In this way, the profile back is inclined corresponding to a transverse component of an accident force to be expected and applies a good stabilization component against undesired buckling in relation to the transverse component.

Advantageously, at least two auxiliary profiles spaced from each other are provided. The energy absorption device is stabilized even better against undesirable buckling when a plurality of auxiliary profiles is used. The spacing between the auxiliary profiles allows for their unimpeded deformation during an accident.

The auxiliary profile may especially preferably be fastened to the main profile over a greater length in an area on the support structure side than in an area on the bumper side. The shorter fastening length in the area on the bumper side makes a deformation of the auxiliary profile and the main profile easier here. The greater fastening length in the area on the support structure side increases the resistances of the auxiliary profile and the main profile to deformation here. The force applied to the support structure may be kept at an essentially constant level.

A transition area may preferably be provided, in which the auxiliary profile is fastened to the main profile over a shorter length than in the area on the support structure side and over a greater length than in the area on the bumper side. In the transition area, the auxiliary profile and the main profile have a moderate resistance against deformation viewed overall, compared to the areas on the support structure and bumper sides. This contributes well to keeping the force applied to the support structure at a constant level.

The auxiliary profile may advantageously be fastened to the main profile over approximately 30% to 45% of its length in the area on the support structure side, preferably over approximately 40% of its length. In this way, the auxiliary profile and the main profile have an increased resistance to deformation in a good area, i.e., a good area which first deforms at higher forces.

The auxiliary profile may especially preferably be fastened to the main profile over approximately 3% to 10% of its length, preferably over approximately 5% of its length, in the area on the bumper side. The auxiliary profile and the main profile thus have a good area in which the resistance to deformation is lower, i.e., which already absorbs energy at lower forces, because auxiliary profile and main profile may fold freely in a good area.

The auxiliary profile may advantageously be fastened to the main profile over approximately 5% to 15% of its length, preferably over approximately 10% of its length, in the transition area. The auxiliary profile and the main profile thus have a good area of moderate resistance to deformation viewed overall, i.e., a good area in which energy is only absorbed at a later point in time.

The auxiliary profile may favorably have a greater material strength on the support structure side than on the bumper side. The auxiliary profile has a higher resistance to deformation on the support structure side than on the bumper side.

The auxiliary profile may preferably have at least two material parts of different material thicknesses. The auxiliary profile thus has a different resistance to deformation in each material part.

The auxiliary profile may advantageously have a material part which has a material thickness varied by rolling. The provision of the areas of different material thicknesses may thus be performed for many workpieces in an efficient process.

The material of the auxiliary profile may advantageously have a higher strength on the support structure side than on the bumper side. The auxiliary profile thus has a lower resistance on the bumper side than on the support structure side.

The auxiliary profile may especially expediently have at least one longitudinal bead extending in its longitudinal direction, preferably in the area proximal to the support structure. In the area of the longitudinal bead, the auxiliary profile has a higher resistance to deformation in its longitudinal direction.

The auxiliary profile may especially preferably have at least one transverse bead extending transversely to its longitudinal direction, preferably in the area close to the bumper. The auxiliary profile may be folded more easily in its longitudinal direction in the area of the transverse bead. The transverse bead defines an area for intentional folding deformation, the energy absorption device as a whole remaining stabilized against undesired buckling.

If the bumper is situated offset to the support structure and the energy absorption device bridges the offset, a first cross-sectional section of the main profile which is situated in front in the offset direction may preferably have a higher deformation resistance than a second cross-sectional section of the main profile which is situated behind the first cross-sectional section in the offset direction. In this way, a cross-sectional section of the main profile, which is endangered by buckling by the structural offset, is stabilized.

A first cross-sectional section of the main profile which is located on a first horizontal side of the energy absorption device in relation to the vehicle may advantageously have a higher deformation resistance than a second cross-sectional section of the main profile which is located on the second horizontal side of the energy absorption device in relation to the vehicle. The anterior cross-sectional section of the main profile in the direction of a transverse component of an accident force is thus stabilized against undesired buckling.

The first cross-sectional section may preferably have a greater material thickness than the second cross-sectional section. The first cross-sectional section thus has a higher resistance to deformation than a second cross-sectional section.

The material of the first cross-sectional section may preferably have a greater material thickness than the second cross-sectional section. The first cross-sectional section thus has a higher resistance to deformation than the second cross-sectional section.

The material of the first cross-sectional section may advantageously have a higher strength than the material of the second cross-sectional section. The second cross-sectional section thus has a lower resistance to deformation than the first cross-sectional section.

More chamfers may advantageously be provided on the first cross-sectional section than on the second cross-sectional section. The first cross-sectional section thus has a higher resistance to deformation than the second cross-sectional section.

The main profile in the intermediate profile may especially preferably be produced from sheet-metal-type material and/or sheet-metal-type profiles. The energy absorption device may thus be implemented having low weight and a high level of design freedom.

BRIEF DESCRIPTION OF THE DRAWINGS

An embodiment of the invention is shown in the drawing and described hereafter. In the figures.

DETAILED DESCRIPTION OF PREFERRED EMBODIMENTS

Figure 1:
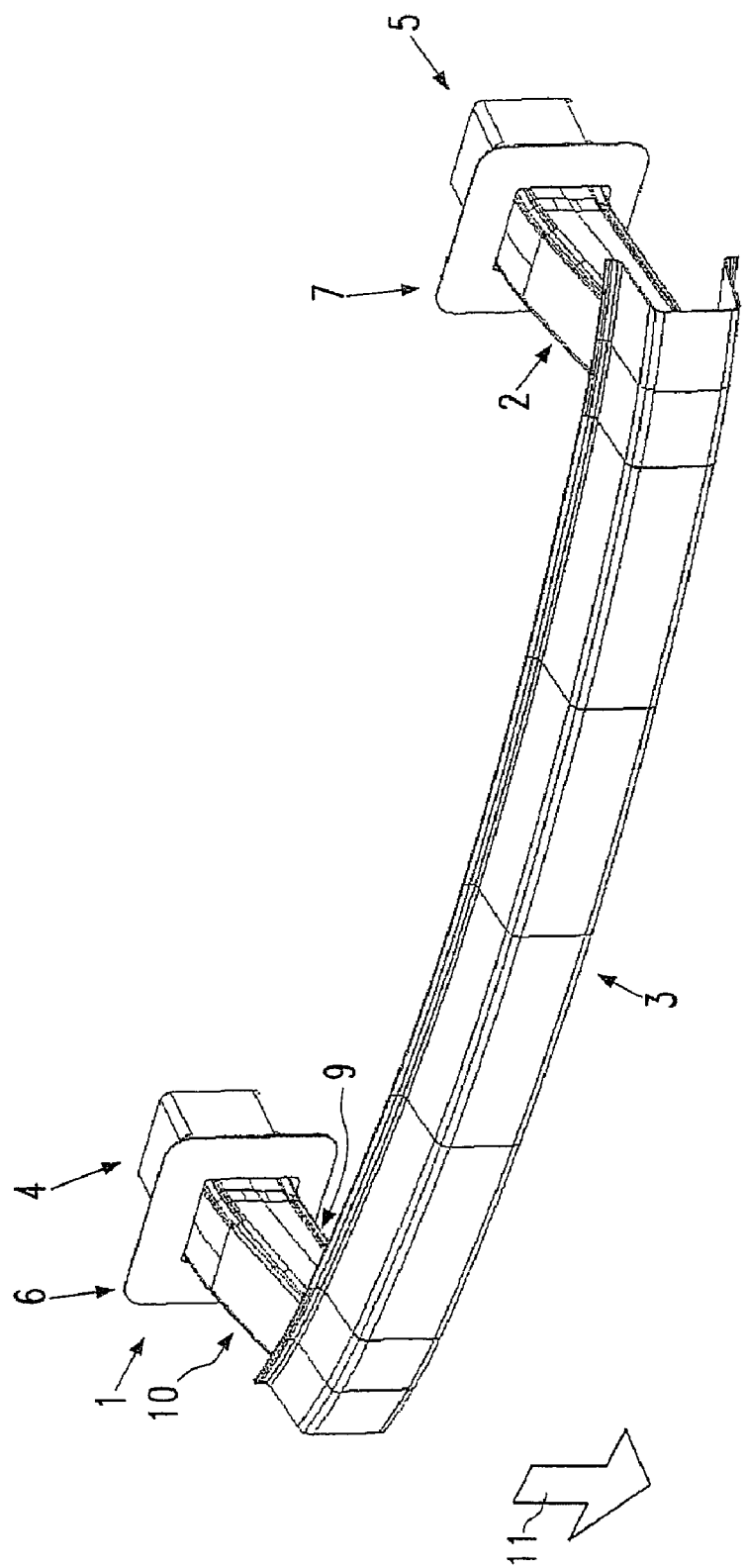
FIG. 1 shows a perspective view of energy absorption devices of a first embodiment of the invention between a crossbeam of a bumper and support structures of a vehicle.

In the following description, same reference numerals are used for analogous elements.

FIGS. 1-11 relate to a first embodiment of the invention.

FIG. 1 shows partly a body configuration of a vehicle. It shows support structures 4, 5, energy absorption devices attached to the structures 4, 5, and a bumper, only a crossbeam 3 of the bumper being shown. The energy absorption devices, the subject of the invention, are disposed symmetrically between the respective support structure and the bumper, i.e. the crossbeam. Thus, the crossbeam connects both energy absorption devices 1, 2. In the present embodiment, the support structures constitute beams of a chassis or platform of a vehicle.

The bumper, i.e. the crossbeam 3, is disposed at an offset (direction indicated by arrow 11) to the support structures 4, 5. The offset is bridged by the respective energy absorption devices which are fastened, preferably removably, to the corresponding support structures via respective flanges 6, 7.

In the present embodiment, the offset is vertical. A horizontal offset is an additional or alternative possibility.

Figure 2:
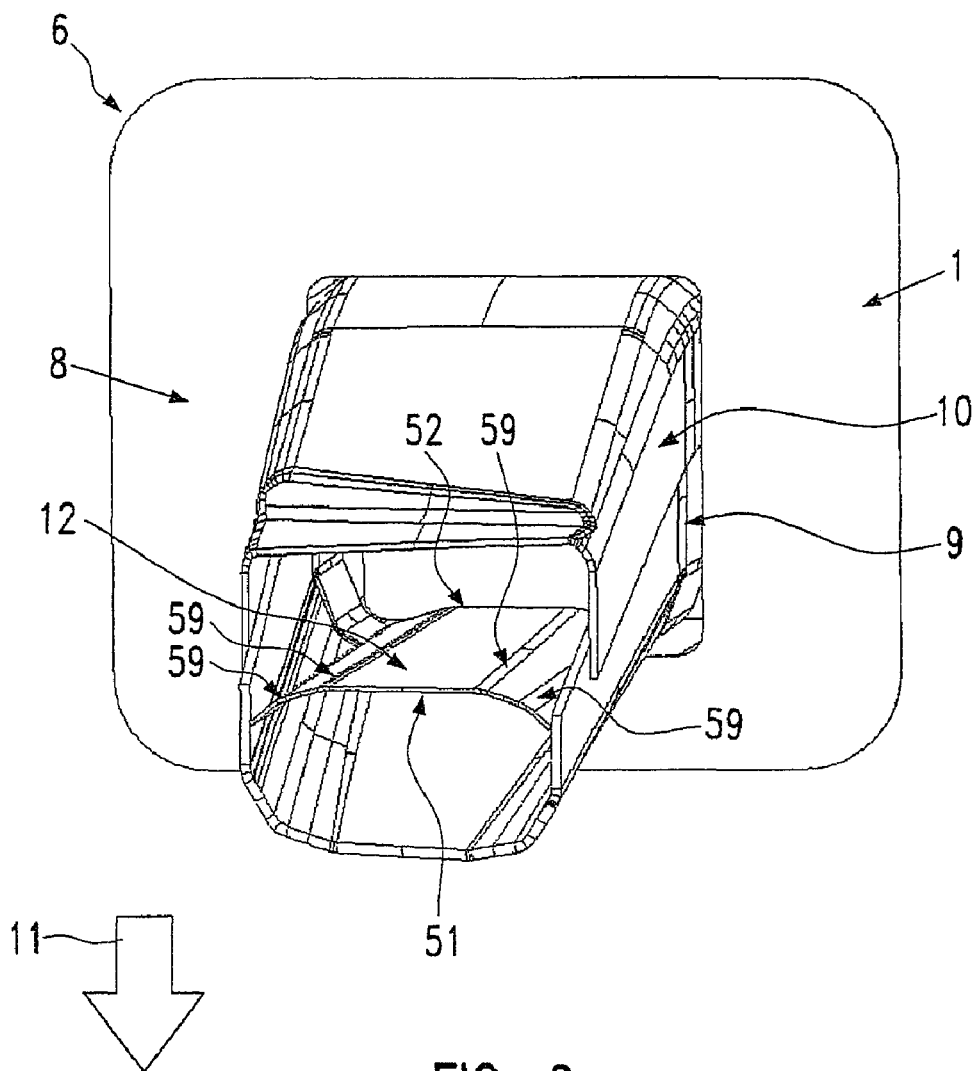
FIG. 2 shows a perspective illustration of one of the energy absorption devices according to the invention from FIG. 1.

FIG. 2 shows a perspective view of the left energy absorption device 1 of FIG. 1. The device has a deformable main profile 8 which is hollow in cross-section and which supports the bumper via the crossbeam 3. The main profile may have a closed or open hollow-body structure.

The main profile 8 has a first cross-sectional segment 9 and a second cross-sectional segment 10. In relation to the direction of the offset 11, the first segment 9 is anterior and the second segment 10 is disposed behind it. In the present embodiment, relative to the vehicle, the first segment 9 is the lower segment and the second segment 10 is the upper segment.

In the instant embodiment, the two segments are shell-type structures which are interconnected by joints, e.g. welding joints, and share an inner space. However, it is also feasible to provide a one-piece main profile part.

The energy absorption device comprises at least one deformable auxiliary profile 12 which is disposed in a sectional area of the main profile 8. The auxiliary profile can be disposed inside or outside of the main profile 8 and extends in the longitudinal direction of the main profile and stabilizes the main profile against an undesired buckling. Thus, despite the offset between the support structure and the crossbeam, accident forces acting essentially parallel to the longitudinal axis of the support structure can be well accommodated, absorbed and conveyed toward the support structure, wherein the energy absorption capability of the absorption device 1 can be well utilized. The auxiliary profile has a shell structure.

Both cross-sectional segments 9, 10 and the auxiliary profile 12 are shaped of sheet metal and/or sheet metal profiles which can be further reshaped if necessary.

The auxiliary profile 12 can be disposed at the first and/or the second cross-sectional segment 9, 10. In the present embodiment, the profile 12 is mounted on the first segment 9 and serves to stabilize the segment 9 against undesired buckling.

Figure 3:
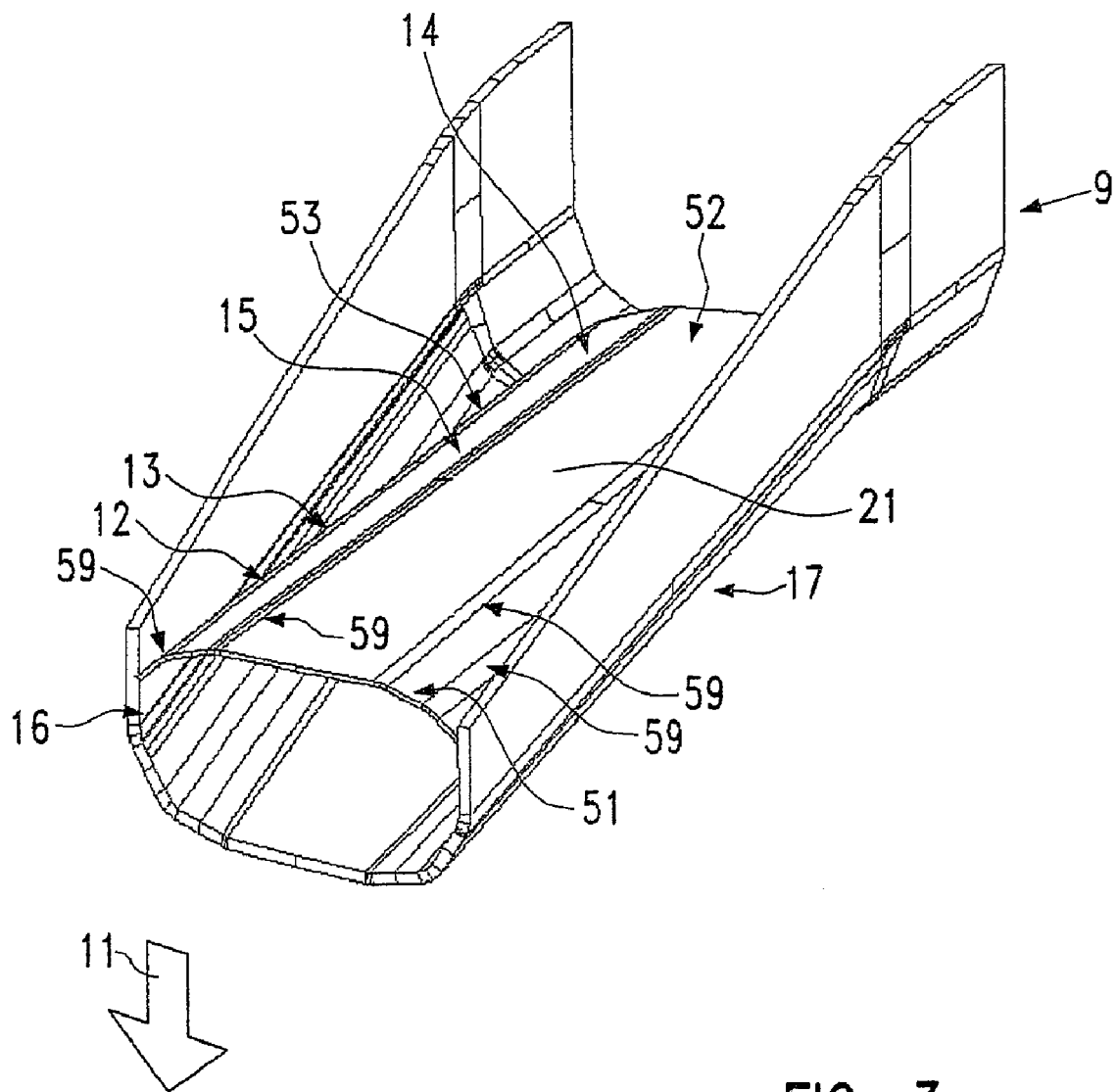
FIG. 3 shows a perspective illustration of a part of the energy absorption device from FIG. 2.

As shown in FIGS. 2 and 3, the auxiliary profile has essentially an arched contour which, in this embodiment, resembles letter U or C. Further, the cross-section of the auxiliary profile has chamfers 59 which serve to further stabilize the profile 12 against undesirable buckling.

The auxiliary profile 12 forms an essentially convex contour with an area of the cross-section of the first or the second segments 9, 10—in this embodiment, of the first segment 9. As a result, the rigidity of the auxiliary profile 12 and the rigidity of the first sectional segment 9 complement each other well.

The auxiliary intermediate profile 12 extends essentially over the entire length of the first cross-sectional segment 9. As can be seen in FIGS. 2 and 3, the auxiliary profile 12 is inclined relative to the main profile 8. The end 51 of the profile 12, on the bumper side, is disposed approximately in the middle of the main profile 8 relative to the offset direction 11. The other end 52 of the profile 12, on the support structure side, is disposed as anterior in the main profile relative to the direction 11. The end 51 is disposed in the area of an opening 16 of the first segment 9, i.e. in a posterior area of the first segment 9 relative to the direction 11. The end 52 on the side of the support structure is disposed in the area of the floor 17 of the first segment 9, i.e. anterior in the offset direction 11.

The auxiliary profile 12 extends continuously between the bumper-side end 51 and the opposite end 52. However, the profile 12 can also be discontinuous, e.g. fragmented.

Figure 4:
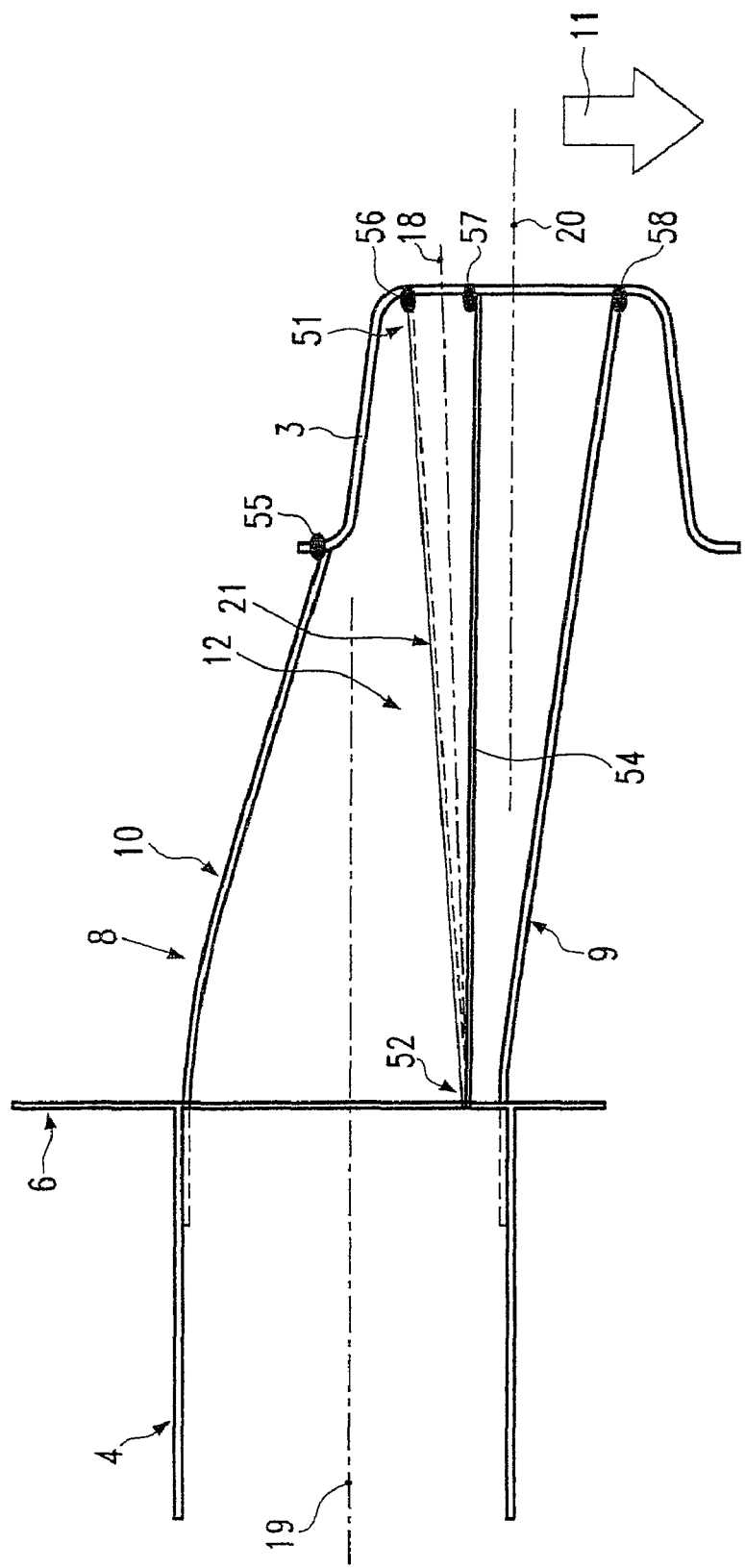
FIG. 4 shows a schematic sectional view of the energy absorption device between the bumper and one of the support structures according to the first embodiment.

As can be further seen in FIG. 4, the auxiliary profile 12 has a slope (inclination) relative to a longitudinal axis of the support structure, the slope being opposite to the direction 11. A longitudinal center line 18 of the auxiliary profile 12 extends towards the cross-beam 3 convergently with a longitudinal central line 19 of the support structure 4, which means that the two lines define a corresponding angle relative to the direction 11. In the direction towards the crossbeam 3, the line 18 extends divergently from a center line 20 of the crossbeam 3 and the two lines form a corresponding angle with relation to the direction 11.

Figure 5:
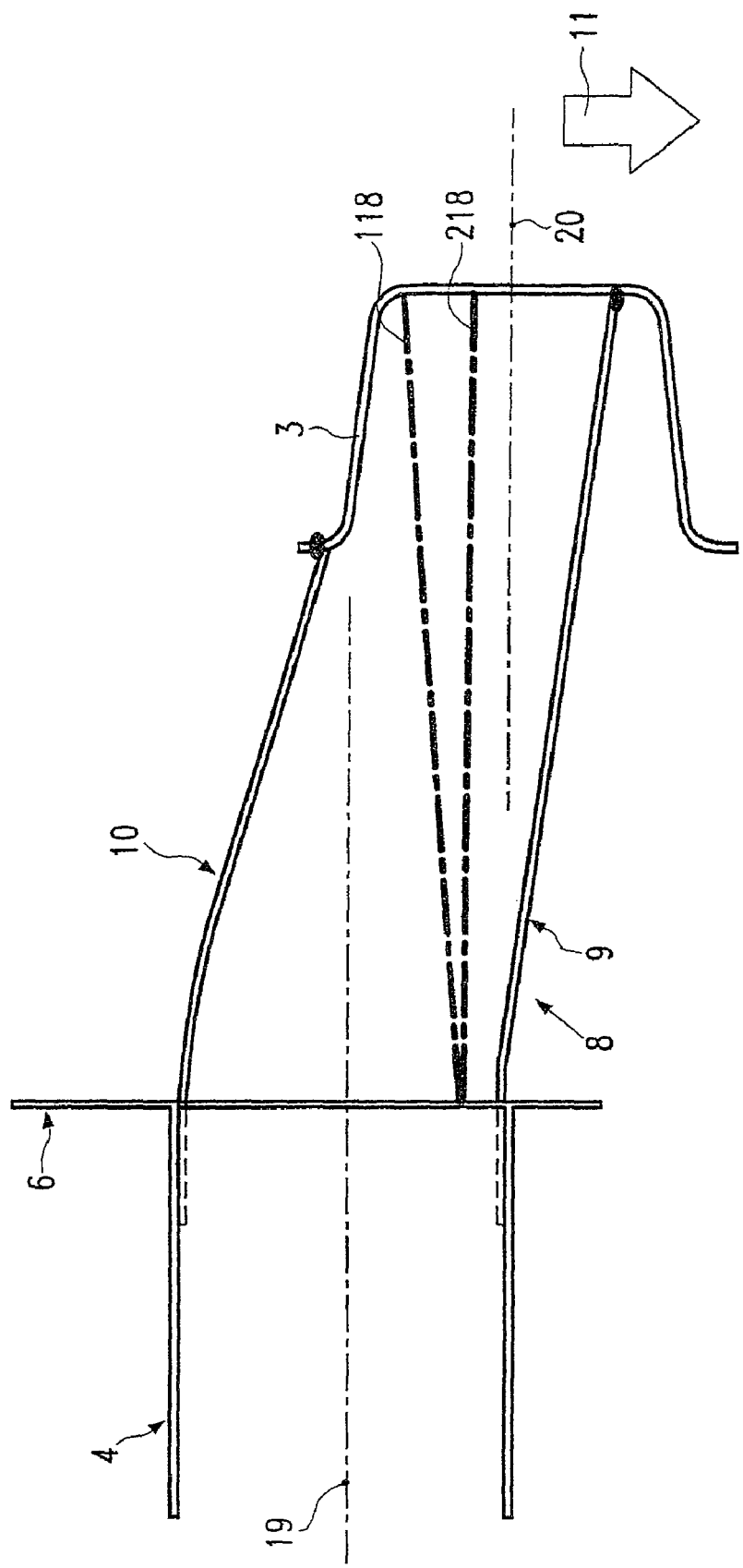
FIG. 5 shows a schematic sectional illustration having alternative orientations of an auxiliary profile of the energy absorption device, FIG. 6 essentially shows a top view of the part of the energy absorption device from FIG. 3.

However, it is also feasible to arrange the profile 12 in parallel to the longitudinal axis of the support structure and/or the crossbeam, thus causing the longitudinal center line 18 of the auxiliary profile 12 to extend parallel to the longitudinal center line 19 of the support structure and/or of the center line 20 of the crossbeam 3. This is illustrated in FIG. 5 where line 218 represents a longitudinal center line of the profile 12.

Equally advantageously, the auxiliary profile can be disposed at a greater inclination regarding longitudinal direction of the support structure 4. This is illustrated in FIG. 5 where line 18 represents a longitudinal center line of the profile 12.

Reference is made again to FIG. 4. The auxiliary profile 12 has an upper surface 21 which is also inclined opposite to the offset direction 11 in relation to the longitudinal axis of the support structure 4. The upper surface 21 extends toward the crossbeam 3 convergently with the center line 19 of the support structure 4. The slope of the surface 21 is stronger than inclination of the center line 18 of the auxiliary profile 12.

The profile 12 has chamfers 53, 54 of which only one is shown in FIG. 4, the chamfers leading in the offset direction 11. The chamfer 54 shown here extends, relative to the offset direction 11, approximately parallel to the longitudinal center line 19 of the support structure 4 and the center line 20 of the crossbeam 3.

The auxiliary profile 12 tapers in a direction towards the support structure 4. The height of the cross-section of the profile 12 decreases towards the structure 4 as seen in FIG. 4. The width of the profile 12 also decreases, as shown in FIG. 6.

An embodiment in which the auxiliary profile essentially maintains its width and/or height over the length of the profile is also feasible. It is also possible to design a version in which the width and/or height of the auxiliary profile 12 increases in the direction toward the support structure 4.

Figure 20A:
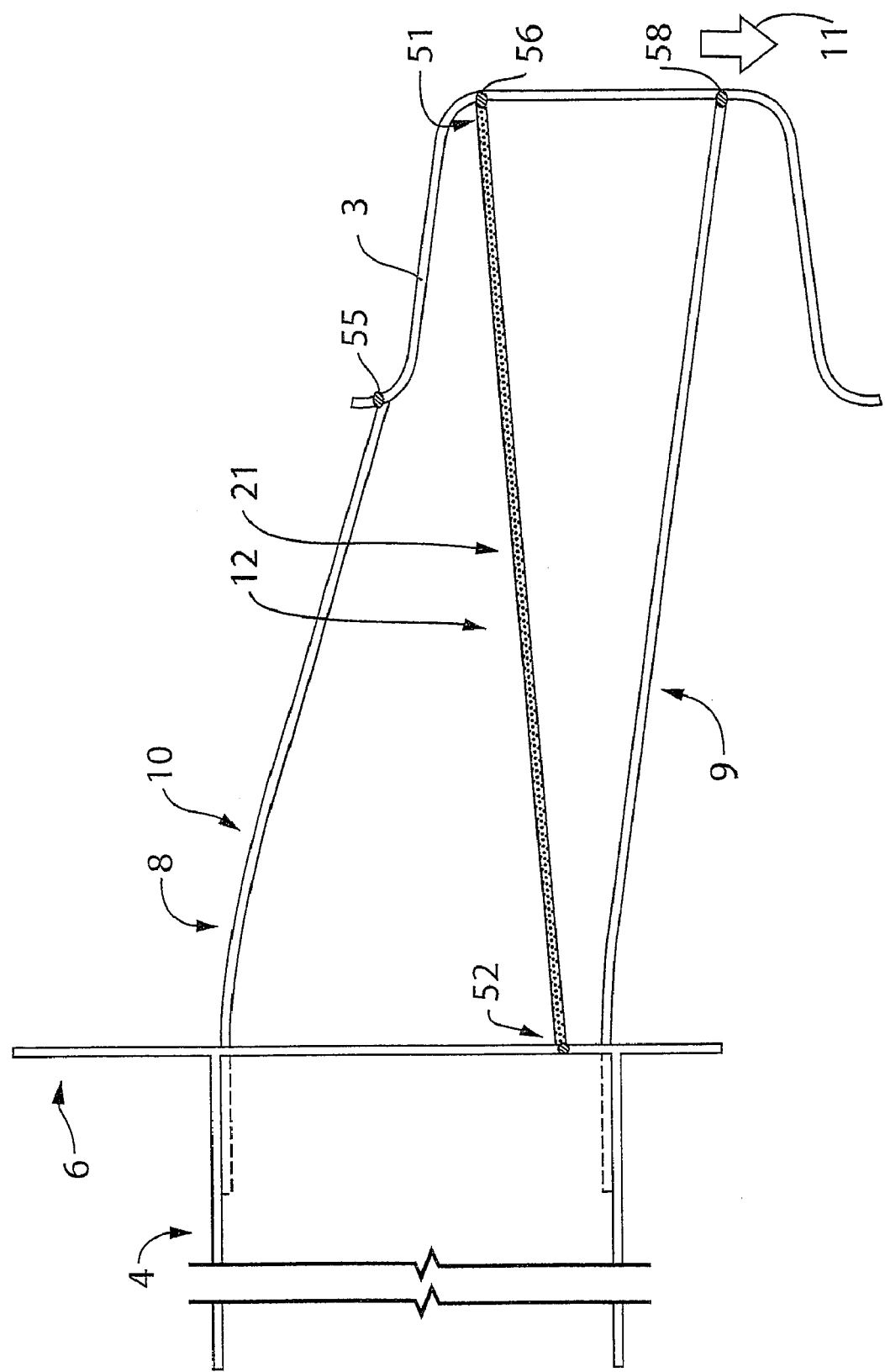
FIG. 20a shows a side cross-sectional view of an energy absorption device including an auxiliary profile having uniform thickness along a length thereof.

FIG. 4 shows further welded bonds 55, 56, 57, 58, which serve to fasten the second segment 10, the auxiliary profile 12 and the first segment 9 to the crossbeam 3. It can also be seen in FIG. 4 that the auxiliary profile 12 extends toward the support structure up to an area of a flange 6. The profile 12 is welded to the flange 6 or is supported freely thereby as shown in FIG. 4. Referring also to FIG. 20a, shown is a side cross-sectional view of a specific variant of the embodiment that is depicted in FIG. 4, in which the material of the auxiliary profile 12 is of uniform thickness.

Figure 6:
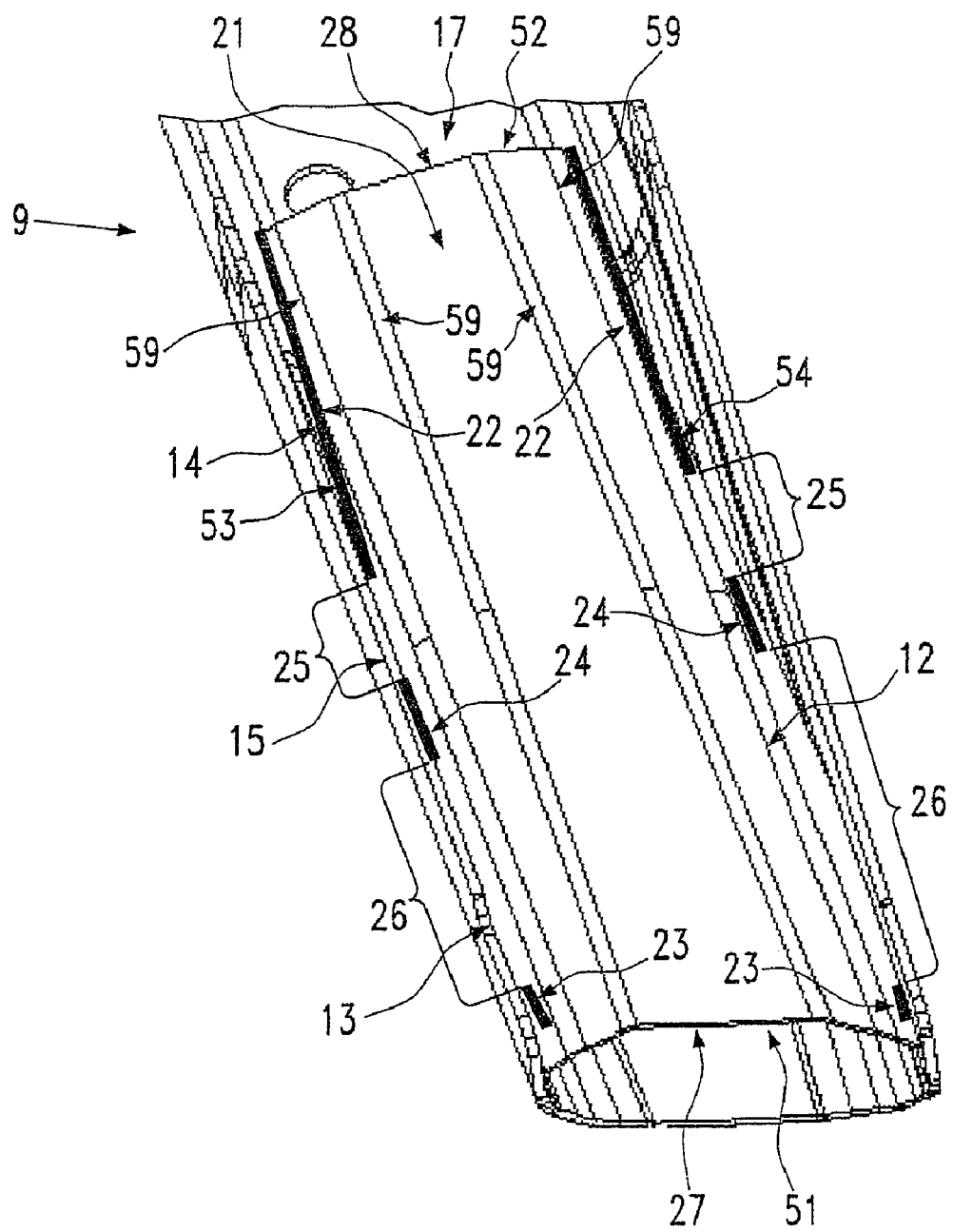

Turning now to FIG. 6, the auxiliary profile 12 is fastened to the main profile 8, i.e. to the first cross-sectional segment 9, over a greater length on the support-structure side than on the bumper side. In this embodiment of the invention, a transition area 15 of the profile 12 is defined between an area 14 on the support-structure side and an area 13 on the bumper side of the auxiliary profile, and the auxiliary profile 12 is fastened to the main profile 8 over a shorter length in the transition area 15 than in the area 14, and over a greater length than in the area 13.

This arrangement of the fastening joints results in the auxiliary profile 12 folding successively from the crossbeam 3 up to the support structure 4, whereby the level of force applied to the support structure 4 remains essentially constant.

Since the auxiliary profile 12 is fastened to the main profile, i.e. to the first segment 9, to a smallest degree in the bumper-side area 13, the profile 12 can fold most freely in that area in the event of a deformation. The deformation resistance is thus lowest in the area 13 in relation to the fastening. In the area 14, on the support-structure side, the deformation resistance is highest in relation to the fastening because the auxiliary profile 12 is fixed in area 14 over the largest area. In the transition area 15, the deformation resistance relative to the fastening is between that of the area 14 and that of the area 13.

As shown in FIG. 6, welded bonds 22 are provided on both sides of the auxiliary profile 12 on the support-structure side. The bonds 22 fasten the profile 12 to the main profile 8, i.e. to the first segment 9, over approximately 30% to 45% of the auxiliary profile's length, preferably over approximately 40% of the auxiliary profile's length. Welded bonds 23, provided on both sides of the profile 12 on the bumper side, fasten the profile 12 to the main profile 8, i.e. to the first segment 9, over approximately 3% to 10% of the auxiliary profile's length, e.g. 5 to 20 mm, preferably over approx. 5% of the auxiliary profile's length, e.g. 10 mm. Central welded bonds 24, provided on both sides of the profile 12 in the transition area, fasten the profile 12 to the main profile 8, i.e. to the first segment 9, over approximately 5% to 15% of the auxiliary profile's length, e.g. 10 to 30 mm, preferably over approx. 10% of the auxiliary profile's length, e.g. 20 mm.

The fastening joints i.e. the welded joints 22, 22; 23, 23; 24, 24, can be effected as continuous joints or interrupted joints e.g. spot welds.

The fastening joints i.e. the welded joints 22, 22; 23, 23; 24, 24, extend essentially in the longitudinal direction, or along the length, of the auxiliary profile 12. This promotes a good folding of the profile 12 (during an accident), which contributes to a uniform level of a force applied to the support structure. During the folding, the folds extend essentially transversely to the longitudinal direction of the auxiliary profile 12.

Spacings 25, 25 are provided between the welded joints 22, 22 on the support-structure side and the middle welded joints 24, 24 respectively. The spacings 25, 25 extend each over approximately 5% to 15% of the length of the auxiliary profile 12, e.g. 15 to 30 mm, preferably over approximately 10% of the auxiliary profile's length, e.g. 20 mm. Spacings 26, 26 are provided between welded joints 23, 23 on the bumper side and the middle welded joints 24, 24 respectively. The spacings 26, 26 extend each over approximately 30% to 45% of the length of the auxiliary profile 12, preferably over approximately 30% to 40% of the auxiliary profile's length (FIG. 6). The left-hand spacing 26 in FIG. 6 is shown as shorter than the right-hand spacing 26.

It is feasible to provide still more spacings and/or welded joints for the above-described arrangement.

As shown in FIG. 6, a spacing is also provided between each welded joint 23, 23 on the bumper side and an end 27 of the auxiliary profile 12 on the bumper side. On the other hand, the welded joints 22, 22 on the support-structure side extend up to an end 28 of the auxiliary profile 12 on the support-structure side.

In the area of the above-mentioned spacings, the auxiliary profile can fold freely relative to the first segment 9 upon deformation.

When selecting the length of the joints, e.g. welded joints, and of the spacings, consideration is given to the total length of the energy absorption device, the cross section of the energy absorption device, the thickness of the material, the strength of the material and the forces likely to be transmitted.

The energy absorption device of the invention may comprise a plurality of auxiliary profiles. The profiles are preferably spaced from each other to enable their deformation independently from each other. Despite the spacing, the auxiliary profiles can be fastened jointly to the main profile, e.g. welded together to the main profile with the lateral edges of the auxiliary profiles situated one above another.

The material of the auxiliary profile 12 may have a greater thickness on the support-structure side than on the bumper side. The greater thickness affords a greater deformation resistance on the support-structure side than on the bumper side. As is shown in FIG. 20c, the auxiliary profile 12 may be constructed from at least two pieces of different thickness. The pieces may be welded together.

Figure 20B:
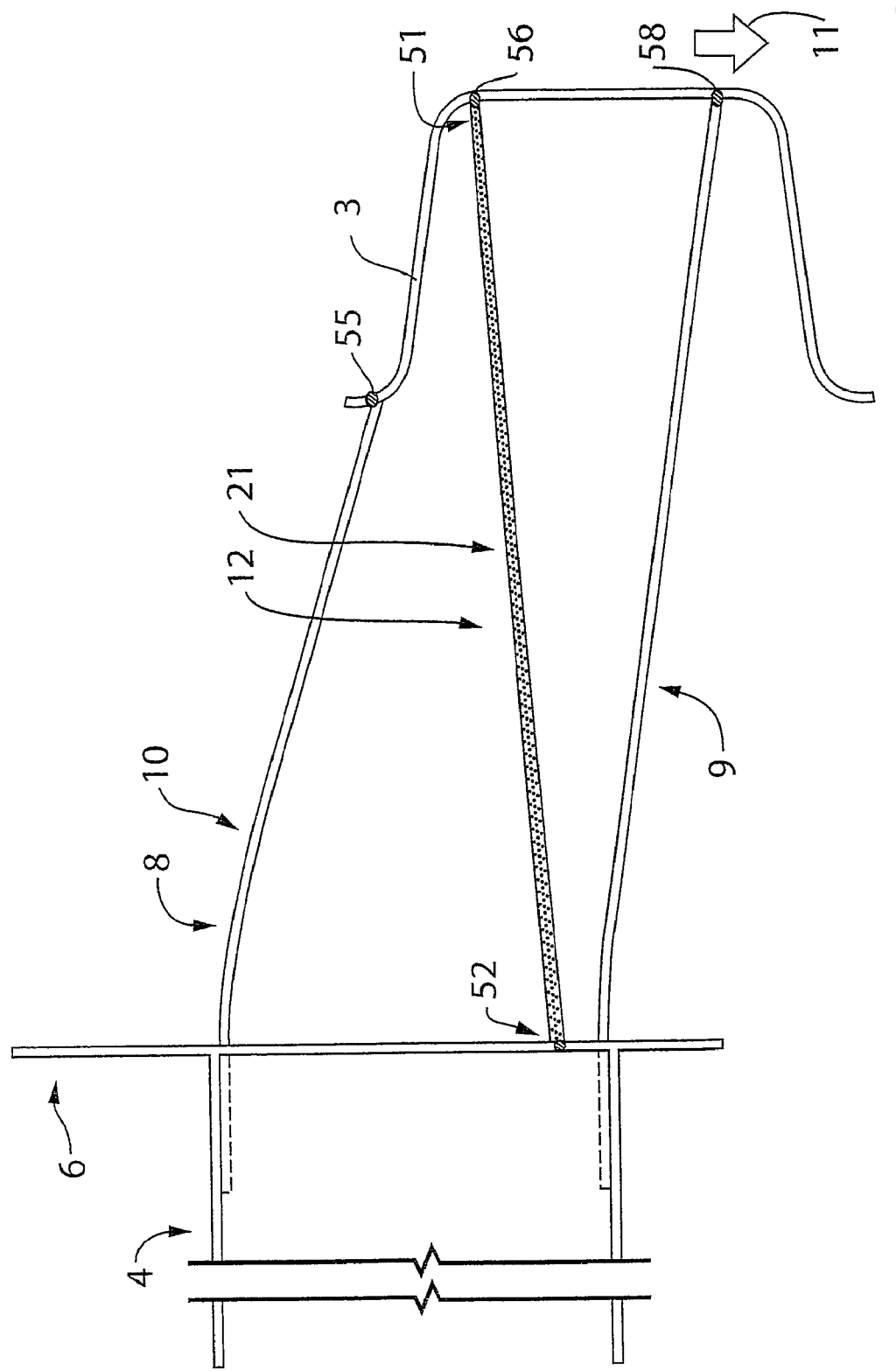
FIG. 20b shows a side cross-sectional view of an energy absorption device including an auxiliary profile having a continuously variable thickness along a length thereof.
Figure 20C:
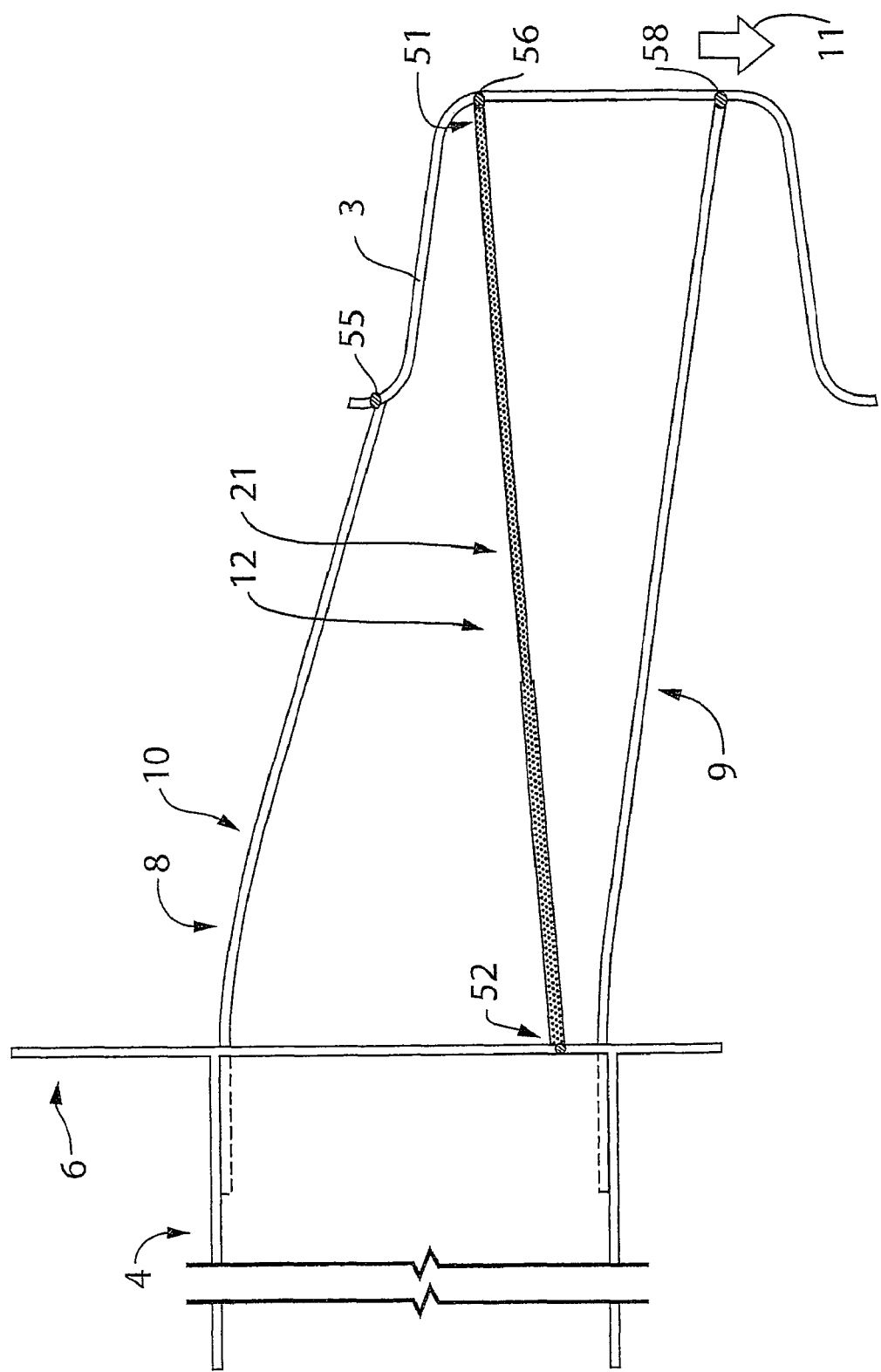
FIG. 20c shows a side cross-sectional view of an energy absorption device including a two-piece auxiliary profile having a step-wise non-uniform thickness along a length thereof, and, FIG. 20d shows a side cross-sectional view of an energy absorption device including an auxiliary profile having variable material strength along a length thereof.

As is shown in FIG. 20b, it is also possible to make the auxiliary profile 12 as a one-piece part the thickness of which is varied through rolling. The variation of thickness can be stepless, or progressive, which results in a progressive variation of deformation resistance. The thickness can be varied flexibly during rolling, in particular with regard to the placing of specific thicknesses.

As is shown in FIG. 20d, the material of the auxiliary profile 12 may have a greater strength on the support-structure side (depicted using dense stippling) than on the bumper side (depicted using less dense stippling). This is another possibility to provide the auxiliary profile 12 with a greater deformation resistance on the support-structure side.

The above-mentioned different thicknesses and strengths of the material of the profiles can be implemented by using so-called tailored blanks, either welded or rolled.

Figure 7:
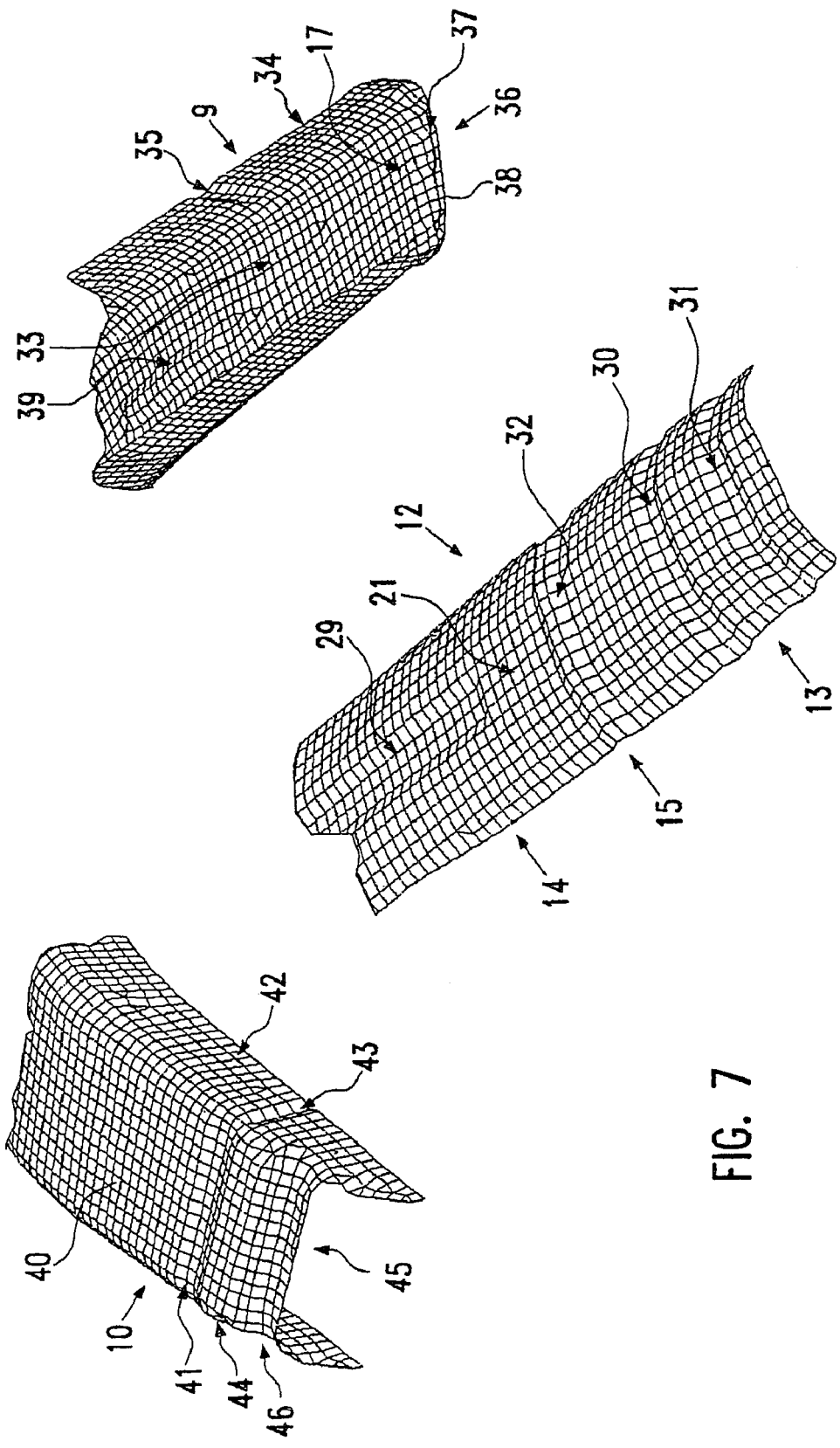
FIG. 7 shows, partially and individually, two cross-sectional views of a main profile and an auxiliary profile of the energy absorption device.

As shown in FIG. 7, the auxiliary profile 12 has a longitudinal bead 29 which is disposed in an area 14 of the profile on the support-structure side and extends approximately in a longitudinal direction of the profile 12. The bead 29 is formed in the upper surface 21 of the profile 12 as a depression (recess) in the surface, the depression extending toward the inner space of the profile 12. The bead 29 increases the resistance of the auxiliary profile 12 against deformation in a longitudinal direction of the profile 12.

In the area 13 on the bumper side, the auxiliary profile 12 has two transverse beads 30, 31 which extend approximately transversely to the longitudinal direction of the profile 12. The beads 30, 31 are formed as depressions (recesses) in the profile 12, the depressions extending toward the inner space of the profile 12. Alternatively, three or four beads can be provided in the area 13.

The auxiliary profile 12 has a transition area 15 in which there is provided a transverse bead 32 which extends approximately transversely to the longitudinal direction of the profile 12, the bead 32 in this embodiment being formed by embossing directed away from the inner space of the profile 12. The spacing between the bead 32 and the adjacent transverse bead 30 in the area 13 on the bumper side is greater, in this embodiment, than the interspacing between the transverse beads 30 and 31.

The transverse beads 30, 31, 32 serve to decrease the resistance of the auxiliary profile 12 to a deformation in the longitudinal direction of the profile 12, and thereby the beads facilitate a desired folding of the profile 12.

With the above-described features which may also be utilized partly or individually, the auxiliary profile is provided with a lower deformation resistance in the direction toward the bumper than in the direction toward the support structure. These measures can also be applied to the first segment 9 and the second segment 10 of the main profile 8, also partly or individually. The segment 9 and/or segment 10 may also have a greater thickness on the support-structure side than on the bumper side, can be made of a material of a greater strength on the support-structure side than on the bumper side, may have at least one longitudinal bead and/or have at least one transverse bead, as described above for the auxiliary profile 12.

By way of example, FIG. 7 shows the first segment 9 and the second segment 10 with beads. The first segment 9 has transverse beads extending approximately transversely to the longitudinal direction of the segment 9 in an area which approximately corresponds to the transition area 15 of the auxiliary profile 12. A first transverse bead 33 is formed in the floor 17 of the first segment 9 and, in this embodiment, protrudes upward, elevated toward the interior of the segment 9. A second transverse bead 35, adjacent the first bead 33, is formed in a side wall 34 of the first segment 9, and also protrudes toward the interior of the segment 9.

The first segment 9 has a bead 37 situated at the bumper-side end of the segment 9. The bead 37 extends approximately transversely or diagonally to the longitudinal direction of the segment 9 and is essentially parallel to the edge 38 of the bumper-side end 36 of the segment 9. In this embodiment, the bead 37 is depressed away from the interior of the first segment 9.

In an area which corresponds to the area 14 of the auxiliary profile 12 on the support-structure side, the first segment 9 has a longitudinal bead 39 which is formed in the floor 17 of the segment 9 and extends in the longitudinal direction of the segment 9. In this embodiment, the bead 39 is formed by a protrusion raised toward the interior of the first segment 9.

The second cross-sectional segment 10 has a first transverse bead 41 in its upper surface 40, the bead 41 disposed correspondingly to the first transverse bead 33 of the first segment 9. The bead 41 in this embodiment is raised toward the inner space of the second segment 10. Adjacent to the first bead 41, a second transverse bead 43 is formed in a side wall 42 of the second segment 10 correspondingly to the second transverse bead 35 of the first segment 9.

From the first transverse bead 41 of the second segment 10, the profile of the upper surface 40 extends into a third transverse bead 44 which protrudes in the opposite direction to the first transverse bead 41. The longitudinal position at which the first transverse bead 41 extends into the third transverse bead 44 corresponds in this embodiment to the longitudinal position of the second transverse bead which is formed in the side wall 42.

A bead 46 which extends approximately transversely to the longitudinal direction of the second segment 10 is formed in the upper surface of the segment 10 at the bumper-side end 45 of the segment 10. In this embodiment, the bead 46 is depressed toward the interior of the second segment 10 and, as shown in FIG. 7, is disposed in the vicinity of the third transverse bead 44 of the second segment 10.

The direction of convexity of the respective transverse beads determines the direction in which the desired folding of the profiles will occur.

The above-described measures are intended to provide the auxiliary profile and/or the first segment and/or the second segment with a lower deformation resistance on the bumper side than on the support-structure side. Owing to the contribution of each of the measures, the force exerted on the support structure 4 during deformation of the inventive energy absorption device remains relatively constant.

It is also feasible to provide a lower deformation resistance on the support-structure side and a higher deformation resistance on the bumper side.

The deformation resistance of the first segment and that of the second segment are not in symmetry. Overall, the first segment 9 of the main profile is designed to have a higher deformation resistance than the second segment 10, particularly resistance against undesirable buckling. For example, in contrast to the second segment 10, the first segment 9 has a longitudinal bead 39. The first segment 9 may also have a greater thickness and/or greater strength of material and/or more chamfers than the second segment 10.

Figure 8:
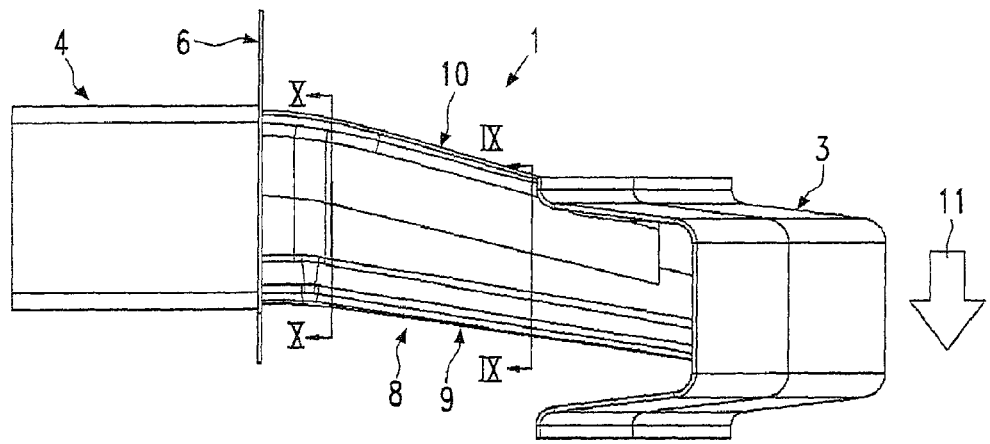
FIG. 8 shows a side view of the energy absorption device according to FIG. 1.
Figures 9, 10:
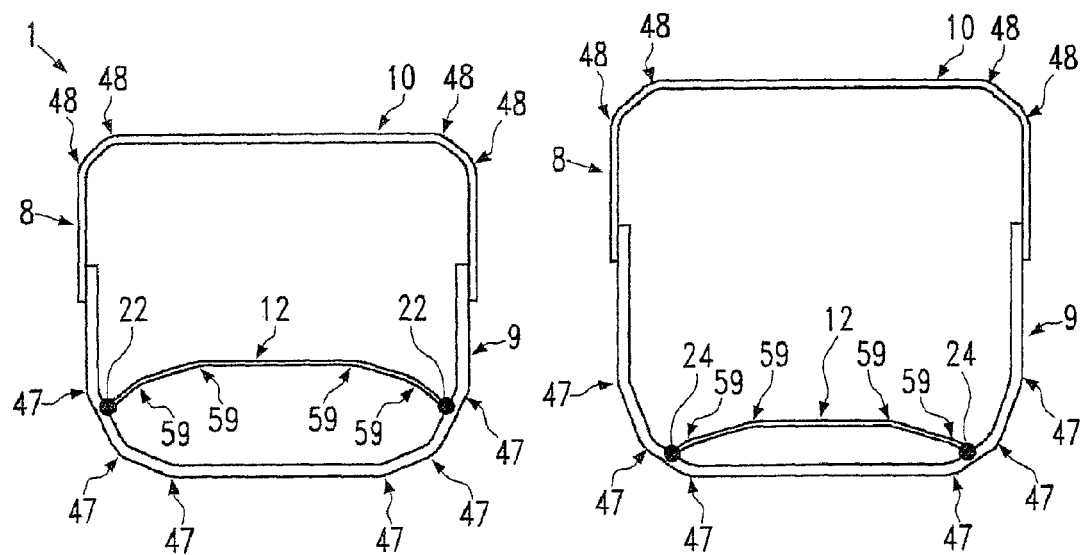
FIG. 9 shows a sectional view of the energy absorption device along a line IX-IX in FIG. 8.
FIG. 10 shows a sectional view of the energy absorption device along a line X-X in FIG. 8.

FIGS. 9 and 10 represent cross-sectional views of the energy absorption device along the lines IX-IX and X-X of the side view of FIG. 8. A greater thickness of the material of the first segment 9 compared to that of the second segment 10 is illustrated schematically in FIG. 9 and FIG. 10.

As shown also in FIGS. 9 and 10, the cross-sectional shapes of the first and second segment are significantly different. The cross-sectional profile of the first segment 9 has more chamfers 47 than the profile of the second segment 10, although both profiles are essentially U-shaped or C-shaped. In the embodiment illustrated herein, the first segment 9 has six chamfers 47 while the second segment 10 has four chamfers 48, whereby the first segment 9 is stiffer than the second segment 10 in this regard.

Figure 11:
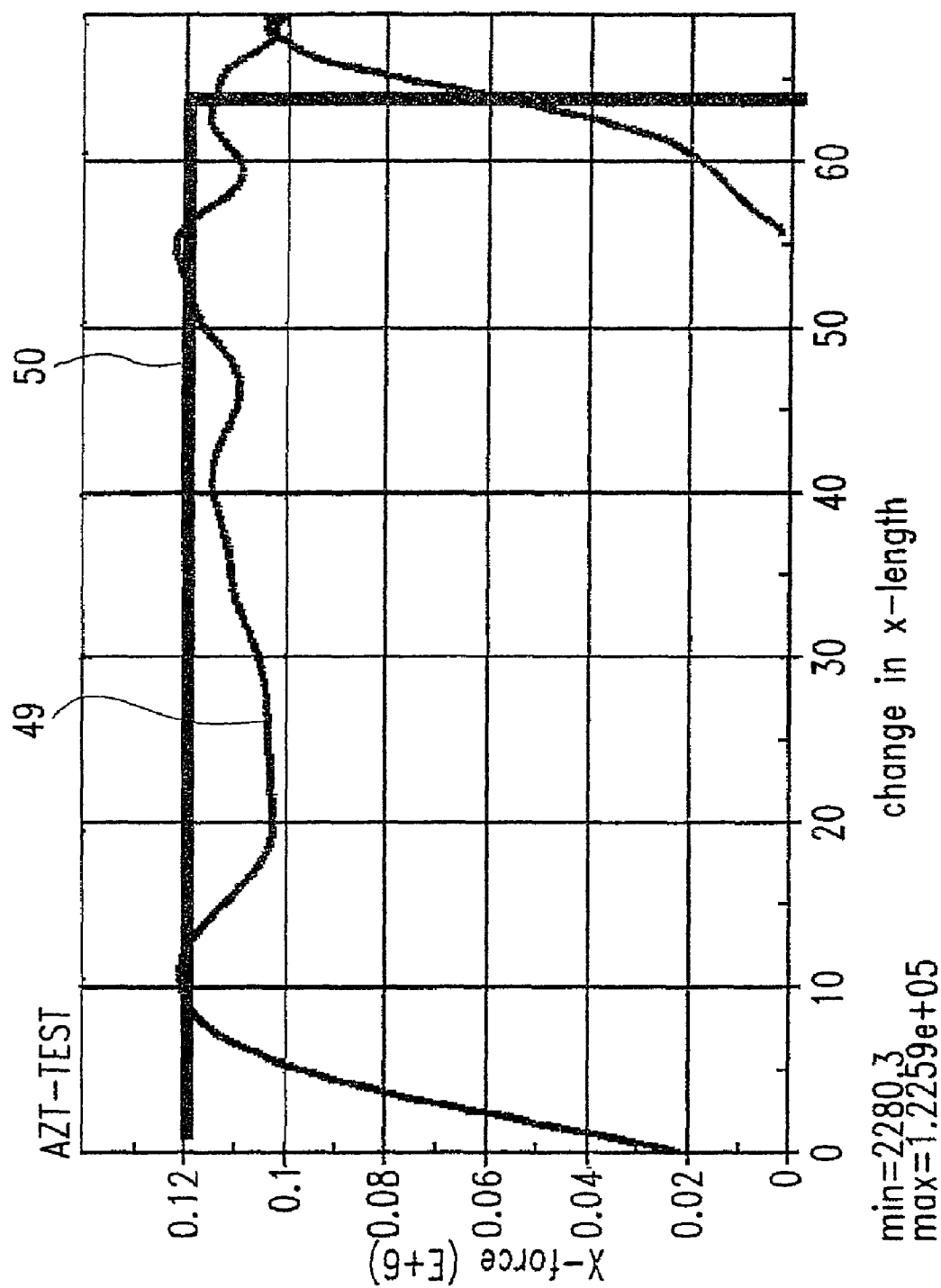
FIG. 11 shows a force-distance diagram of the energy absorption device.

FIG. 11 shows a force-displacement diagram of the energy absorption device 1 of the invention. An ideal response 50 is represented by bold lines extending next to the curve 49 which shows the measurement result. The ideal plot 50 corresponds to 100% energy absorption efficiency. As can be inferred from the drawing, the energy absorption device 1 according to the invention produces an absorption efficiency of approximately 90%, which means that the device offers good absorption efficiency for non-axial loads. The force applied to the support structure remains essentially at the same level.

In the above embodiment, the bumper 3 is mounted at an offset relative to the support structure 4, 5 of the vehicle and the energy absorption device 1, 2 bridges the offset 11. However, it is also feasible to employ the present invention by providing an energy absorption device which extends essentially in the longitudinal direction of the support structure 4, 5 of the vehicle. A lateral cross-sectional segment of the main profile can be stabilized using an auxiliary profile. This arrangement can enable a good absorption efficiency of forces acting at an angle to the longitudinal axis of the vehicle and/or to the longitudinal direction of the support structure. For example, good absorption is possible for forces acting at an angle of approximately 0 to 40°, particularly up to 30°. Despite the angularity of the forces, the energy absorption device maintains its firmness for the purpose of absorption and transmission of outside forces.

FIGS. 12 to 19 illustrate a second embodiment of the invention. The essential differences between the first and second embodiment are explained below.

In the second embodiment, the energy absorption devices 301, 302 extend essentially in the longitudinal direction of the support structures 4, 5, i.e. of the longitudinal beams (girders) of the vehicle. Thus, the devices 301, 302 constitute extensions of the support structures 4, 5.

The devices 301, 302 are essentially symmetrical to each other, therefore only the left-hand device 301 (FIG. 12) will be described in detail hereinafter.

Figure 12:
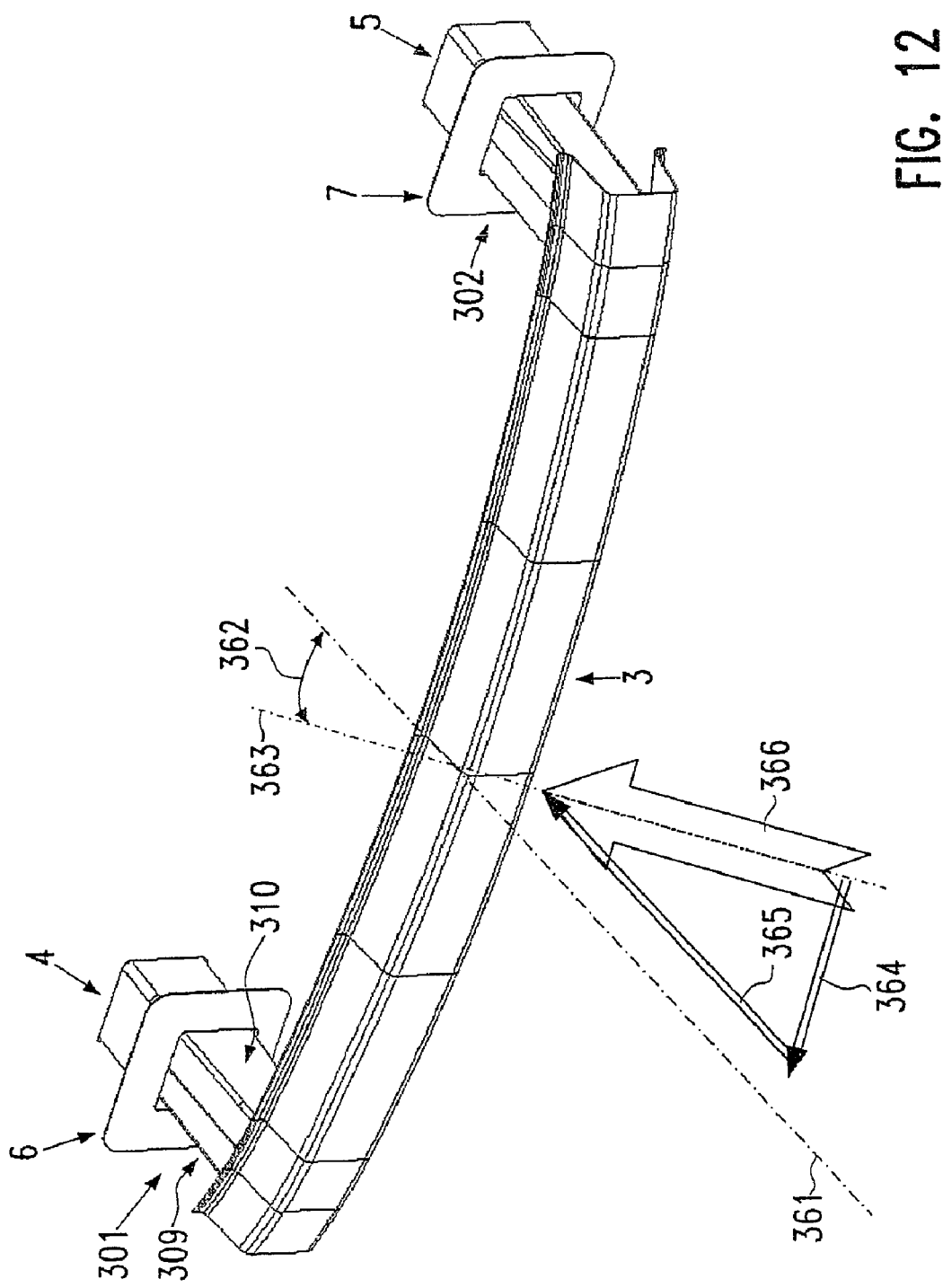
FIG. 12 shows a perspective view of energy absorption devices of a second embodiment of the invention between a crossbeam of a bumper and support structures of a vehicle.
Figure 13:
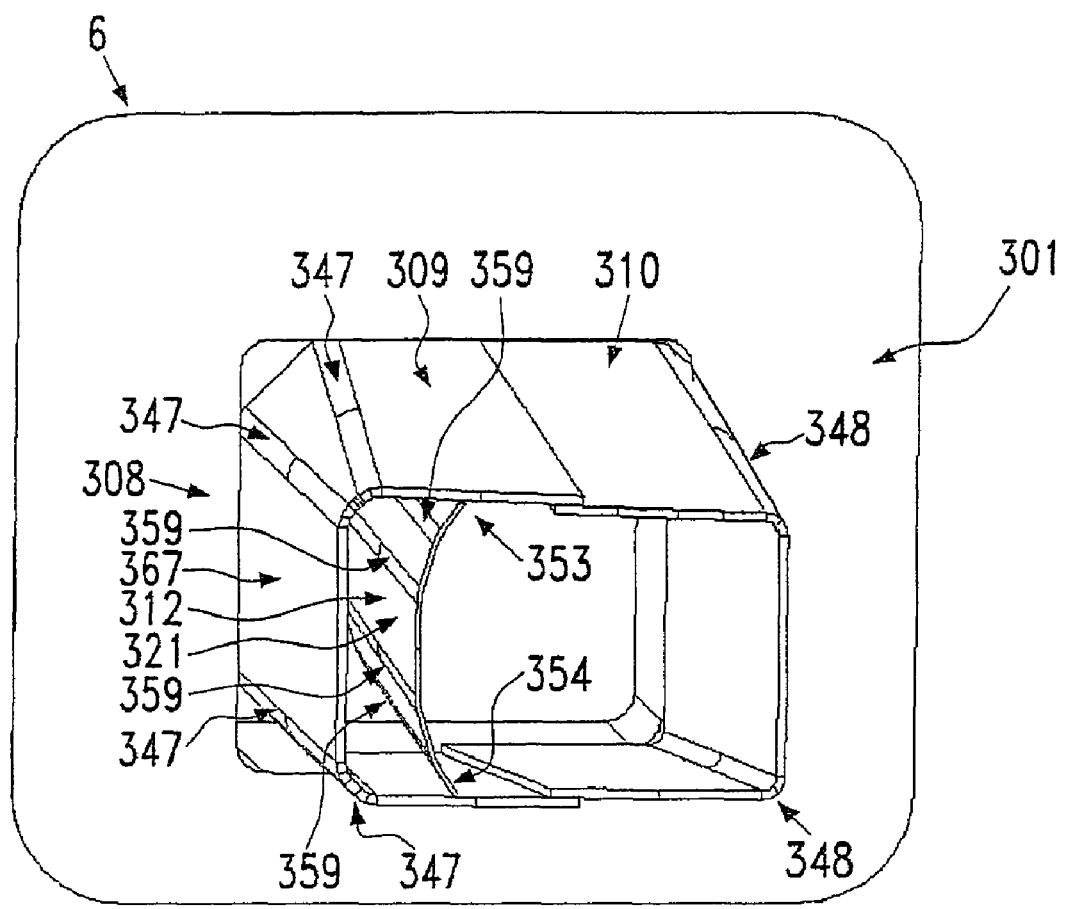
FIG. 13 shows a perspective illustration of one of the energy absorption devices according to the invention from FIG. 12.

As will be seen in FIGS. 12 and 13, the device 301 has two segments 309, 310 which are situated laterally, in an approximately horizontal plane, with relation to the vehicle. The first segment 309, i.e. the left segment in FIG. 13, is disposed outwardly relative to the longitudinal center axis 361 of the vehicle. The second, right-hand side segment 310 is disposed inwardly relative to the axis 361.

An accident force 366 acting at an angle to the axis 361 and consisting of a transverse component 364 and a longitudinal component 365, is represented in FIG. 12.

In the second embodiment of the invention, the first segment 309 is stabilized against undesirable buckling by the transverse component 364 of the accident force 366 with the aid of an auxiliary profile 312 shown in FIG. 13. This serves to stabilize the segment of the energy absorption device that is anterior in the direction of the transverse component 364 of the accident force 366.

In other words, the auxiliary profile functions to stabilize the segment situated in front in the offset direction. In the second embodiment of the invention, the offset is reflected in the transverse component 364 of the accident force 366, while in the first embodiment, a structural offset is provided.

Figure 14:
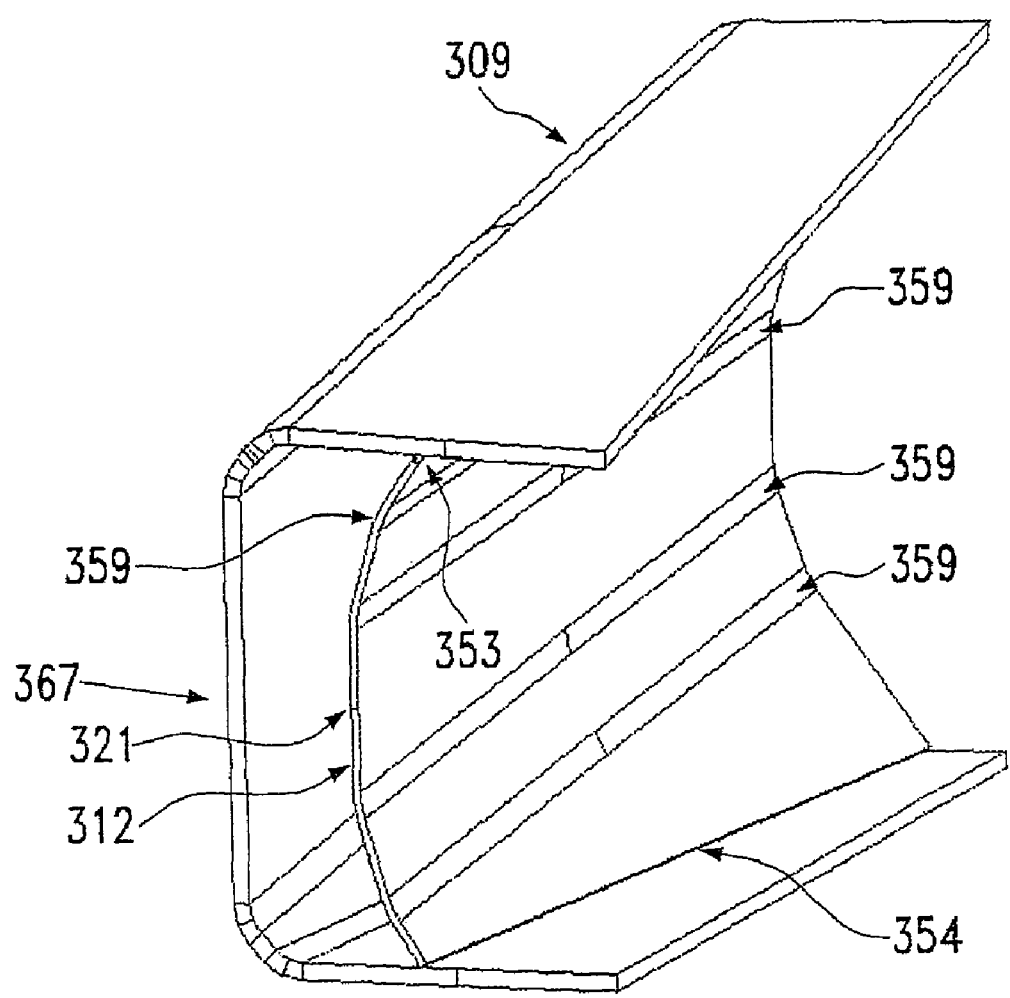
FIG. 14 shows a perspective illustration of a part of the energy absorption device from FIG. 13.

FIGS. 13 and 14 explain the structure of the auxiliary profile 312 and its arrangement in the main profile 308 which is composed of a first segment 309 and a second segment 310. The profile 312, viewed in the longitudinal direction of the device 301, extends at an angle to the first segment 309 i.e. is horizontal and laterally inclined in relation to the longitudinal direction of the support structure 4. The lateral edges 353, 354 of the auxiliary profile 312 run at a greater angle in relation to the upper surface 367 (roof) of the first segment 309 than an upper surface 321 of the auxiliary profile 312. The spacing between the upper surface 367 of the first segment 309 and the auxiliary profile 312, in particular the upper surface 321 of the profile 312, increases toward the support structure 4. The auxiliary profile 312 and its upper surface 321 are thus laterally inclined, in a horizontal plane, in relation to the vehicle in the direction of the transverse component 364 of the expected accident force 366.

Figure 16:
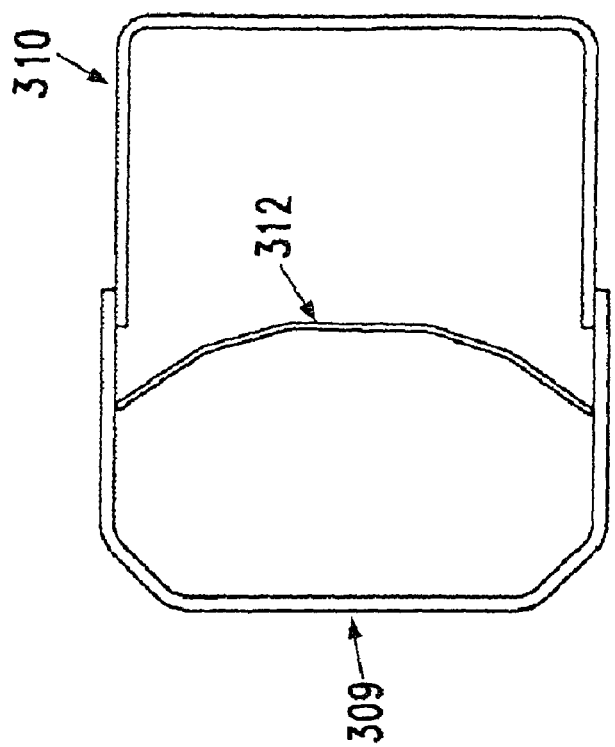
FIG. 16 shows a cross-sectional view of an alternative design of the cross-sectional profile of the energy absorption device.
Figure 15:
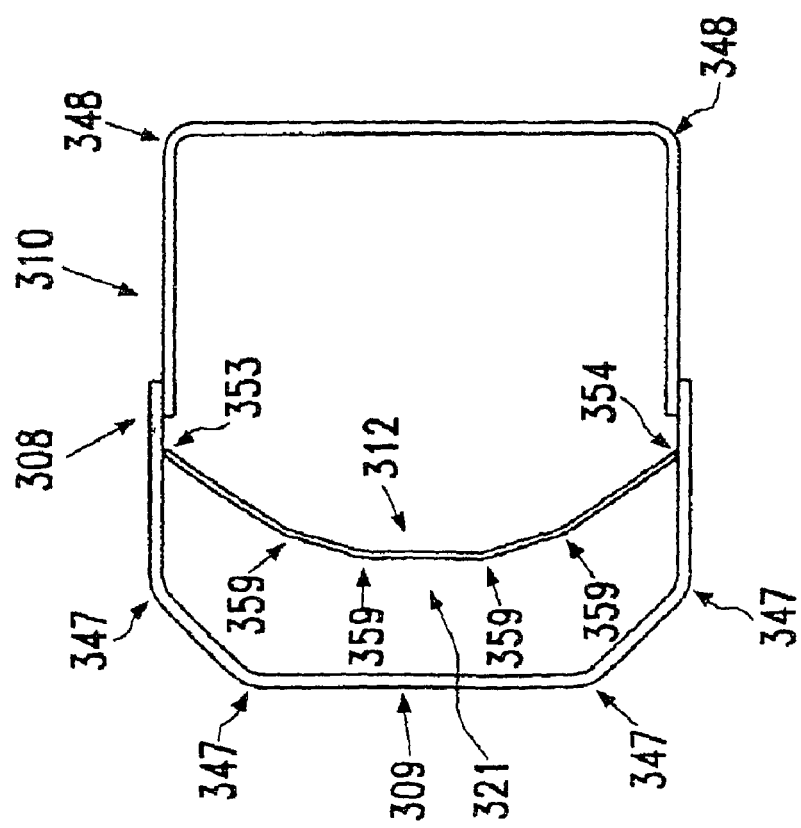
FIG. 15 shows a cross-sectional view of the energy absorption device from FIG. 13.

FIG. 15 shows a cross-section of the energy absorption device approximately in the middle of the length of the device. The auxiliary profile 312 forms an essentially convex contour with respect to the upper surface 367 of the first segment 309. Another possibility, as shown in FIG. 16, is that the auxiliary profile 312 forms an essentially convex contour with the first segment 309.

The measures taken in the first embodiment to design the deformation resistance and/or the deformation behaviour of the energy absorption device and/or its components are applicable by analogy in the second embodiment. Thus, for example, the first segment 309 in the second embodiment has also a higher deformation resistance than the second segment 310. The anterior segment in the direction of the transverse component 364 of the accident force 366 is thus already stabilized against undesired buckling in addition to the reinforcement by the auxiliary profile 312.

As in the first embodiment of the invention, the first segment 309 has more chamfers than the second segment 310. Specifically, the first segment 309 has four chamfers 347, while the second segment 310 has two chamfers 348. As can be seen in FIG. 13, in contrast to the first embodiment, the chamfers in the first segment 309 extend clearly divergently, away from each other, in the direction toward the support structure 304.

Figure 17:
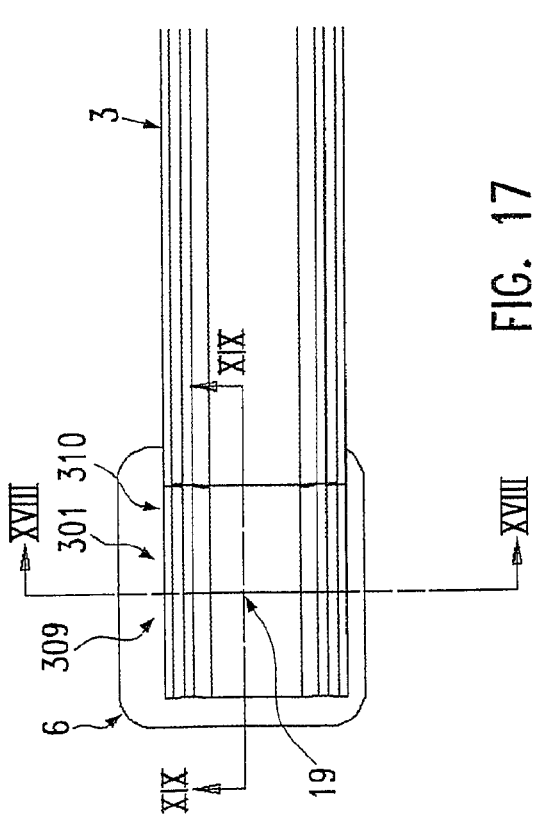
FIG. 17 shows a partial frontal view of the configuration from FIG. 12.
Figure 18:
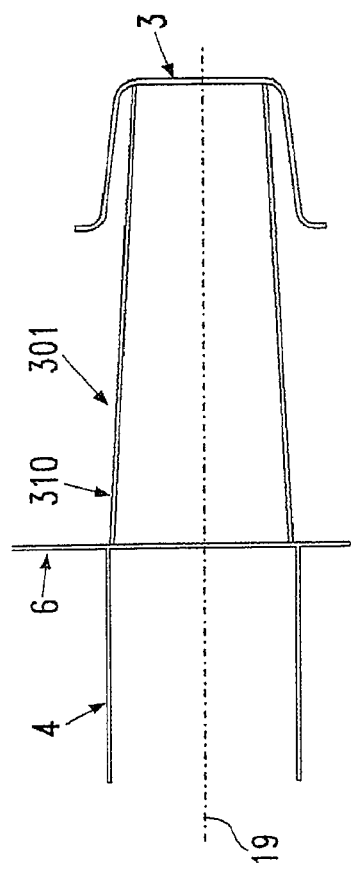
FIG. 18 shows a schematic sectional view of the energy absorption device between the bumper and one of the support structures along a line XVIII-XVIII in FIG. 17.

FIG. 18 shows a schematic sectional view of the energy absorption device 301 along a line XVIII-XVIII of FIG. 17, the course of the sectional planes being indicated. As can be seen in FIG. 18, the absorption device tapers toward the bumper (i.e. the crossbeam 3) in a vertical direction.

Figure 19:
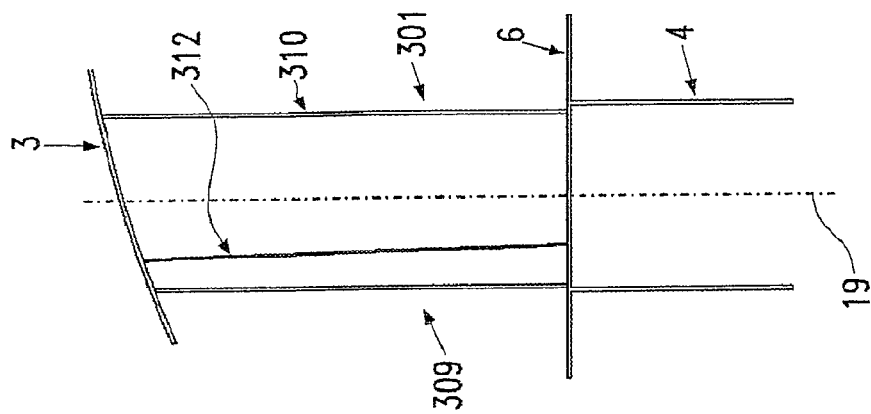
FIG. 19 shows a schematic sectional view of the energy absorption device between the bumper and one of the support structures along a line XIX-XIX in FIG. 17.

FIG. 19 is a sectional view of the device 301 along a line XIX-XIX of FIG. 17, the course of the sectional planes being indicated. As shown in FIG. 19, the device 301 has essentially a uniform horizontal width in the direction toward the crossbeam 3.

In the second embodiment of the invention, the first segment and the auxiliary profile are provided horizontally on the external side (externally in a horizontal plane). It is also possible to provide the section 309 and/or the auxiliary profile 312 on the internal side horizontally. The energy absorption device can thus be stabilized in particular against undesired buckling as a result of accident forces, in which the transverse component is directed opposite to the transverse component 364 shown in FIG. 12.

The device of the second embodiment affords a similar, satisfactory energy absorption efficiency as the device of the first embodiment, i.e. a similar efficiency as shown in FIG. 11.

It is also feasible to combine the features of the first and the second embodiments. This means that in the case of a structural offset between the support structure and the crossbeam of the bumper, additional stabilization can be provided against buckling resulting from accident forces acting at an angle to the device.

The devices of the invention are also applicable to vehicles where bumpers do not have crossbeams.

What is claimed is:

1. An energy absorption device disposed between a support structure of a vehicle and a bumper to absorb energy by deformation, the energy absorption device comprising:
a deformable, hollow main profile extending in a longitudinal direction between a bumper side that supports the bumper and a support structure side that is mounted to the support structure, the support structure side being opposite the bumper side; and
a deformable auxiliary profile extending in said longitudinal direction between the bumper side and the support structure side, said deformable auxiliary profile fastened on said main profile in an area at the support structure side and in an area at the bumper side.

2. The energy absorption device according to claim 1, wherein the bumper is disposed at an offset relative to the support structure and the energy absorption device bridges said offset, and wherein said auxiliary profile is provided to stabilize a first segment of said main profile, said first segment being disposed as anterior in said offset direction.

3. The energy absorption device according to claim 2, wherein said main profile further comprises a second segment that is joined to said first segment, each of said first segment and said second segment being a shell-type component, said first segment and said second segment defining lower and upper portions of said main profile, respectively, relative to the vehicle.

4. The energy absorption device according to claim 2, wherein said auxiliary profile stabilizes said first segment of said main profile which is approximately horizontal in relation to the vehicle.

5. The energy absorption device according to claim 4, wherein said first segment is disposed outwardly in relation to a longitudinal central axis of the vehicle.

6. The energy absorption device according to claim 1, wherein a cross-section of said auxiliary profile forms an essentially convex contour with respect to an upper surface of said first segment.

7. The energy absorption device according to claim 1, wherein said auxiliary profile has chamfers.

8. The energy absorption device according to claim 3, wherein said auxiliary profile is disposed within an interior volume of said main profile between said first segment and said second segment.

9. The energy absorption device according to claim 1, wherein said auxiliary profile tapers in a direction toward said support structure of the vehicle.

10. The energy absorption device according to claim 9, wherein a height of a cross-section of said auxiliary profile decreases in the direction toward said support structure of the vehicle.

11. The energy absorption device according to claim 1, wherein said auxiliary profile tapers in a direction toward the bumper.

12. The energy absorption device according to claim 11, wherein a height of said auxiliary profile decreases in the direction toward the bumper.

13. The energy absorption device according to claim 1, wherein the bumper is disposed at an offset relative to said support structure and the energy absorption device bridges said offset, and wherein said auxiliary profile defines a slope relative to the longitudinal direction, said slope being opposite to the direction of the offset.

14. The energy absorption device according to claim 1, wherein the bumper is disposed at an offset to said support structure and the energy absorption device bridges said offset, and wherein said auxiliary profile has an upper surface which is inclined relative to said longitudinal direction oppositely to the direction of said offset.

15. The energy absorption device according to claim 1, wherein said auxiliary profile is laterally inclined horizontally in relation to a longitudinal direction of said support structure.

16. The energy absorption device according to claim 15, wherein said auxiliary profile has a profile back which is laterally inclined horizontally in relation to said longitudinal direction of said support structure.

17. The energy absorption device according to claim 1, wherein said auxiliary profile is a first auxiliary profile and wherein the device further comprises a second auxiliary profile that is spaced from said first auxiliary profile.

18. The energy absorption device according to claim 1, wherein said auxiliary profile is fastened to said main profile over a greater length in an area on said support structure side than in an area on said bumper side.

19. The energy absorption device according to claim 18, wherein said auxiliary profile is fastened on said main profile over approximately 40% of the length of said auxiliary profile in said area at said support structure side.

20. The energy absorption device according to claim 18, wherein said auxiliary profile is fastened on said main profile over approximately 5% of the length of said auxiliary profile in said area at said bumper side.

21. The energy absorption device according to claim 1, wherein said auxiliary profile has a greater material thickness on said support structure side than on said bumper side.

22. The energy absorption device according to claim 21, wherein said auxiliary profile has at least two material parts of different material thicknesses.

23. The energy absorption device according to claim 21, wherein said auxiliary profile has a material part which has a material thickness varied by rolling.

24. The energy absorption device according to claim 1, wherein the material of said auxiliary profile has a higher strength on said support structure side than on said bumper side.

25. The energy absorption device according to claim 1, wherein said auxiliary profile has at least one longitudinal bead extending in its longitudinal direction.

26. The energy absorption device according to claim 25, wherein said at least one longitudinal bead is disposed in an area proximal to said support structure.

27. The energy absorption device according to claim 2, wherein said first segment has at least one transverse bead extending transversely to its longitudinal direction.

28. The energy absorption device according to claim 27, wherein said at least one transverse bead is disposed in an area proximal to said bumper.

29. The energy absorption device according to claim 3, wherein said bumper is disposed at an offset relative to said support structure and the energy absorption device bridges said offset, and wherein said first segment of said main profile, which is situated as anterior in said offset direction, has a higher deformation resistance than said second segment of said main profile, which is situated behind said first segment in said offset direction.

30. The energy absorption device according to claim 3, wherein said first segment of said main profile, which is located on a first horizontal side of said energy absorption device in relation to the vehicle, has a higher deformation resistance than said second segment of said main profile, which is located on a second horizontal side of the energy absorption device in relation to the vehicle.

31. The energy absorption device according to claim 29, wherein said first segment has a greater material thickness than said second segment.

32. The energy absorption device according to claim 30, wherein said first segment has a greater material thickness than said second segment.

33. The energy absorption device according to claim 29, wherein the material of said first segment has a higher strength than the material of said second segment.

34. The energy absorption device according to claim 30, wherein the material of said first segment has a higher strength than the material of said second segment.

35. The energy absorption device according to claim 29, wherein at least one of said first and second segments includes at least one chamfer and wherein more chamfers are provided on said first segment than on said second segment.

36. The energy absorption device according to claim 30, wherein at least one of said first and second segments includes at least one chamfer and wherein more chamfers are provided on said first segment than on said second segment.

* * * * *